United States Patent [19]

Hacherl et al.

[11] Patent Number: 5,832,225

[45] Date of Patent: Nov. 3, 1998

[54] METHOD COMPUTER PROGRAM PRODUCT AND SYSTEM FOR MAINTAINING REPLICATION TOPOLOGY INFORMATION

[75] Inventors: Donald Joseph Hacherl, North Bend; John Freeman, Redmond, both of Wash.

[73] Assignee: Microsoft Corporation, Redmond, Wash.

[21] Appl. No.: 678,887

[22] Filed: Jul. 12, 1996

[51] Int. Cl.⁶ ..................................................... G06F 13/00
[52] U.S. Cl. ...................................... 395/200.53; 707/200
[58] Field of Search .................................. 707/1, 201, 10, 707/101, 200, 104; 711/141; 395/831, 200.53

[56] References Cited

U.S. PATENT DOCUMENTS

| | | | |
|---|---|---|---|
| 5,434,994 | 7/1995 | Shaheen et al. | 707/201 |
| 5,586,310 | 12/1996 | Sharman | 707/10 |
| 5,588,147 | 12/1996 | Neeman et al. | 707/1 |
| 5,594,921 | 1/1997 | Pettus | 395/831 |
| 5,613,079 | 3/1997 | Debique et al. | 711/141 |
| 5,617,568 | 4/1997 | Ault et al. | 707/101 |
| 5,675,787 | 10/1997 | Miller et al. | 707/104 |
| 5,689,700 | 11/1997 | Miller et al. | 707/10 |
| 5,692,180 | 11/1997 | Lee | 707/10 |

*Primary Examiner*—Le Hein Luu
*Attorney, Agent, or Firm*—Workman, Nydegger, Seeley

[57] ABSTRACT

An automated method of maintaining replication topology information is presented that allows system maintenance to occur with a minimum of system administrator intervention. For a replicated and distributed database across a network of computers, the network is divided or partitioned into sites that are islands of good network connectivity wherein communication between the site computers occurs using high bandwidth, low-latency remote procedure calls (RPCs). Further, intersite connections allow communication between servers of different sites using a low bandwidth, high-latency store and forward messaging scheme. Knowledge consistency checkers running independently on each individual server in the entire network assures that the servers within a site are automatically connected in a full-mesh replication topology within a site and that the sites themselves are connected via a spanning tree of intersite links. The knowledge consistency checker enforced replication topology ensures that replication changes will be transmitted over intersite links as efficiently as possible so that each change will be transmitted over each "expensive" intersite link exactly once across a single direction in order to attain the minimum communication that must occur in order for all servers to be informed of such a change. A change arriving at a site replicates according to the intrasite replication mechanism.

12 Claims, 27 Drawing Sheets

METHOD COMPUTER PROGRAM PRODUCT AND SYSTEM FOR MAINTAINING REPLICATION TOPOLOGY INFORMATION

BACKGROUND OF THE INVENTION

1. The Field of the Invention

This invention relates to systems and methods of creating a replicated and distributed database across a number of different server computers. More specifically, this invention relates to methods, computer program products, and systems for automatically maintaining replication topology information (also known as "knowledge" or "glue" in the X.500 Directory Services specification) between separate computers that requires minimal system administrator intervention.

2. Present State of the Art

A Directory Service implements a database that is both replicated (copies of a given directory object may reside on more than one server) and distributed (a given server may not have copies of all directory objects) for reasons of availability and performance. Changes made to a given instance of an object (replica) will be "replicated" to all other instances of that object wherever they may reside on the network of servers. Because of this, each server implementing a portion of the directory information tree ("DIT") must maintain information relevant to the replication, including location of replicas, of directory objects. This operational information is referred to as "knowledge" to distinguish it from the directory data information that the servers hold (i.e., the contents of the directory objects themselves). An implemented Directory Service, therefore, is an example of a distributed and replicated database and will be referred to throughout as such though the principles discussed herein will apply to any distributed and replicated database.

More generally, replication topology information constitutes all necessary information that a given replication mechanism uses to allow the replication mechanism to function properly and ensure that all database events (additions, deletions, and modifications) are replicated to all instances of the pertinent database objects in a distributed and replicated database. In other words, for a given set of servers and replicas (i.e., for a set of "knowledge" information), a Directory Service replication mechanism will keep the directory data information (as opposed to "knowledge" information) consistent throughout the system with changes made to one instance of a directory object being applied to all other instances. In this manner, whenever replication reaches quiescent state, all instances of a given object will have the same properties.

The distributed database or Directory Service data information is kept consistent throughout all relevant directory servers by the replication mechanism. It also becomes necessary to keep the knowledge (i.e., replication topology information) consistent so that a replication mechanism may operate properly. The normal replication mechanism cannot be used to keep the knowledge consistent across the many different Directory Service servers because the knowledge is different at each server. In other words, each server views the knowledge differently though consistently. This different but consistent concept can be illustrated in the following way. If a group of people at a meeting were to each list the meeting attendees besides themselves, each list would be different. By comparing the different lists prepared by the individual people at the meeting, however, each list could be checked to assure consistency with the other lists.

Conventional distributed and replicated database systems, such as a Directory Services implementation, require an administrator to configure replication topology information or knowledge manually by setting up and removing "replication agreements" between servers as required. A replication agreement is all the necessary information and authorizations to allow the replication mechanism to replicate object instances between servers.

Manual knowledge configuration is a tedious and error-prone task since a network of any complexity will require numerous replication agreements to enable the replication mechanism to function properly. The problem is exacerbated in a partially connected network (i.e., one in which direct communication is not possible between each and every computer) because an administrator or even an automated agent on one computer cannot make all the required knowledge configuration changes since some computers cannot be reached from where the administrator or agent is operating. At least some of the changes will require the agent (whether automated or directly controlled by the administrator) to use another computer and further opens the door for the introduction of errors and inconsistencies in the knowledge set for the system.

Though some attempts have been made to alleviate the system administrator of some of the tedium, such attempted solutions still do not squarely address the partially connected network situation. Ways are sought to reduce replication topology errors since such errors are non-trivial and can be expensive in terms of system down time and data inaccuracies in improperly replicated data objects.

SUMMARY AND OBJECTS OF THE INVENTION

It is an object of this invention to automate management of replication topology information so that new servers may be added to a system of servers supporting a distributed and replicated database with a minimal amount of administrator intervention.

Other objects of this invention include: managing replication topology information to reduce the amount of communication required to communicate replications across site boundaries; allowing replication topology information changes without global understanding of the system topology; providing a new server the ability to more quickly become integrated into a system supporting a distributed and replicated database; more quickly and more accurately making and propagating replication topology information changes; and relieving system administrator tedium.

Additional objects and advantages of the invention will be set forth in the description which follows, and in part will become apparent from the description, or may be learned by the practice of the invention. The objects and advantages of the invention maybe realized and obtained by means of the instruments and combinations particularly pointed out in the appended claims. To achieve the foregoing objects, and in accordance with the invention as embodied and broadly described herein a method, computer program product, and system for maintaining link information is provided.

A replicated and distributed database that has replication topology information according to the present invention partitions the network of servers into sites. "Sites" are islands or groups of servers where there is good connectivity such that each and every machine can communicate directly with each and every other machine on the site through an efficient and inexpensive mechanism. One example would be using a high-bandwidth, low-latency remote procedure calls ("RPCs") to communicate between the servers on the site. In the exemplary embodiment, the site has a full-mesh replication topology wherein any change within a portion of the database residing on any one server in the site is replicated to every other server on that site. Naturally, variations may be made to accommodate partial replication and still be in full harmony with the present invention.

Intersite replication is accomplished by another lower performance but more reliable mechanism since there can be no guarantee of direct communication (i.e., using an RPC for example) for intersite communications. An example of this mechanism is a low-band width, high-latency store-and-forward messaging system between designated "bridgehead" servers in different sites. Sites are bound together through such intersite links to form a spanning tree of connections.

The directory information tree ("DIT") representing the replicated and distributed database is divided into naming contexts ("NCs"). Each naming context is composed of object entries beginning with a root object (NC root) and contains either object entries or heads of another NC. The naming context is used as the minimum unit of replication which means that if a server holds a replica of any one object found in a naming context, it will eventually hold a replica of every object in that naming context once replication is completed. This lowers the amount of replication topology information to be managed though there is no reason that the present invention cannot be applied to object-level or any other level of replication granularity.

Since information is designed to be replicated on a naming context basis, replication topology information (knowledge in the X.500 directory standard ) must be also held on a naming context basis. The exemplary embodiment of the present invention represents intrasite replication information as non-replicated information on or as part of an NC root object. In this embodiment, the replication information consists of a list of servers that the particular naming context is replicated to (the "RepsTo list") and a list of servers the naming context is replicated from (the "RepsFrom list"). Each entry on the two lists also has flags or other information indicating the state and currency of replication for that naming context in connection with the indicated server on the list.

The RepsTo list and the RepsFrom list are different for each server. Therefore, that portion of the naming context containing the RepsTo and RepsFrom lists is said to be non-replicated. Though each list may be different depending on the particular server where the list resides, the lists can be checked with known configuration information regarding the servers on a site as well as with each other in order to verify consistency. Each list is necessarily different because a server will neither replicate to itself or replicate from itself.

Since the NC intersite replication information or knowledge is held as non-replicated information in the naming context root object, it is possible to determine a servers view of the system or overall knowledge by reading the NC root objects residing on that server. An outside agent called a knowledge consistency checker may read and compare intersite replication information and configuration information from two servers to verify that the two servers are consistent as to what portion of the DIT is held and distributed across the servers. Furthermore, the knowledge consistency checker makes configuration adjustments on incongruent servers to bring them into agreement with the other servers on the site. The knowledge consistency checkers are typically background programs that run independently on each and every server within the system.

Because a knowledge consistency checker may not directly connect to a server in another site in order to reconcile and make consistent the configuration information and intersite replication information (knowledge) due to the partially connected nature of the network, the knowledge consistency checkers on the bridgehead servers participating in intersite replication may not be able to query the partner bridgehead server on the other site for available data. The only sure intersite communication is via asynchronous mail messages that are low-bandwidth, and high-latency in terms of communication performance and should therefore be used sparingly. Intersite connection information, therefore, is stored and managed in special objects, called "connectors" or "replication connectors", that are created in the DIT in every naming context that contains server objects, typically a configuration naming context. Essentially, the connector objects will contain a subset of the replication topology information (knowledge) stored in the totality of the naming context root objects found on a particular server. The replication connectors are created as normal objects that get identically replicated by the replication mechanism for the system and are only manipulated by one bridgehead server in the exemplary embodiment.

Each replication connector object describes the intersite connections between one site and another site by way of identifying the bridgehead servers used for the connection. Further, one connector object is required for each site directly connected (e.g., for a site that is directly connected to three other sites, there will be three connector objects in the bridgehead server's configuration naming context). To fully define an intersite connection, there will be a connector object residing in the other site indicating a connection in the opposite direction; therefore, a pair of connector objects defines the intersite connection.

Each connector has a list of the naming contexts that are replicated into a site from the designated remote site (the "InTo list") and a list of the naming contexts that are replicated out of the local site to the remote site (the "OutOf list"). The two connector objects describing a single intersite connection, initially one in each bridgehead server's configuration naming context before replication, will be exact opposites or complementary of each other. This means that any naming context listed in the InTo list of one connector will be listed in the OutOf list of the other connector, and vice versa. Furthermore, every naming context in the pertinent portion of the DIT will be including in one list or the other according to the spanning tree model connecting the sites.

The knowledge consistency checkers running independently on each of the bridgehead servers will compare and reconcile the local connector objects (i.e., those originating on the particular server where the knowledge consistency checker is running) with the complementary replica found in the local configuration naming context as well as other local connector objects. Once a new naming context has been replicated from a site through an intersite connection, the new naming context is replicated from the bridgehead server to each and every server on the site. The knowledge consistency checkers running on the individual site servers modify the intersite replication information portion of the naming context root object to reconcile it with the site configuration information.

This arrangement allows easy administration of the network. An administrator adding a new server to an existing site need only provide the name of a single existing server in that site and all server configuration and naming context root object replication information modification is performed automatically by the knowledge consistency checker. When a new site (along with its naming contexts) is added to the DIT, the installation program creates the necessary two connector objects, one in the new site and one in the existing site to which the new site is connected and makes each known to the other. Furthermore, the matching replication configuration calls are designed to set up replication between the bridgehead servers at the two sites to allow replication and minimally to have the two connector objects replicate between the sites so that each pair of connector objects is available on both sites.

The knowledge consistency checker running on the bridgehead server in the old or existing site will determine if the existing site (i.e., the bridgehead server on the site) is holding replicas of any naming contexts that are not being replicated to the new site as represented in the local connector object. For each such naming context, that naming context will be added to the OutOf list on the connector object and configuration calls will be made to authorize the remote bridgehead server to replicate that naming context from this server.

The modified replication connector object will eventually replicate over to the new site, where the knowledge consistency checker running on the bridgehead server for the new site will examine it for any naming contexts that are not replicated on the existing system. For each such naming context found, the knowledge consistency checker will add a replica of that naming context onto the new site's bridgehead server from the remote bridgehead server on the existing site and modify the local replication connector object to include the particular naming context on the InTo list.

In this manner, a site may be easily added by the administrator identifying the bridgehead server for the existing site to which the new site will be added. Again, minimal system administrator intervention is needed and all knowledge adjustments (i.e., replication topology information) will be made by the independent knowledge consistency checkers running on all of the servers so that all additions made by the installation program and the ramifications thereof will be reconciled throughout the system by means of the replication mechanism working in harmony with the independently running knowledge consistency checkers.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which:

FIG. 2A shows the installation of server C4 onto site C, and FIG. 2B shows the intersite replication connectivity of server C4 to the other servers within site C after the operation of a knowledge consistency checker.

In FIG. 3A, server E1 is brought up in stand alone mode. In FIG. 3B, server E1 is made a bridgehead server with server D4 through the installation program. In FIG. 3C, other servers are shown added into the new site E.

FIG. 5A shows a plurality of naming contexts that would reside on a server or other DSA and particularly points out that the root object contains unique information dependent on the server where it resides. FIG. 5B shows a pair of a particular type of naming context, a configuration naming context, each containing a site server list object that lists all servers in the site, and a connector object representing a unidirectional linkage between bridgehead servers. As shown, there are two configuration naming contexts, one for each site as they exist on the respective bridgehead servers, and each configuration naming context having a connector object, the pair of connector objects being complementary to one another.

FIG. 6A shows the state of server C1–C4 right after the installation program has installed server C4 by identifying C2 as a server on an existing site. FIG. 6B shows synchronization of the site server lists on servers C2 and C4 by operation of the knowledge consistency checker running on server C4. FIG. 6C shows further synchronization of the site server lists on server C1 and C3 by further operation of the knowledge consistency checker running on server C4. FIG. 6D shows the reconciliation of the root object of naming context NC3 with the synchronized site server list on server C4 as modified by the knowledge consistency checker running on server C4. FIG. 6E shows the reconciliation of the root objects for naming context NC1 and naming context NC2 as they reside on servers C1–C3 respectively through a knowledge consistency checker running on each server C1–C3 independently. FIG. 6F shows the state of the naming contexts NC1–NC3 on servers C1–C4 respectively after replication of the naming contexts have taken place. FIG. 6G shows the final reconciliation of the replicated naming contexts NC1–NC3 as performed by the knowledge consistency checker being run independently on each of server C1–C4 respectively.

FIG. 7A shows the state of bridgehead servers D4 and E1 after the install program has created complementary directional links in the form of connector objects. FIG. 7B shows the state of bridgehead servers D4 and D1 after the respective site configuration naming contexts containing connector objects have been replicated to the other server. FIG. 7C shows the reconciliation of each respective local connector object on bridgehead servers D4 and E1 and the bringing across or replication of the indicated naming contexts as done by a knowledge consistency checker running independently on bridgehead servers D4 and E1 respectively. 7D shows the final state once the replication mechanism has carried the changes made in connection with FIG. 7C throughout the system.

DETAILED DESCRIPTION OF THE PREFERRED EMBODIMENTS

Figure 1:
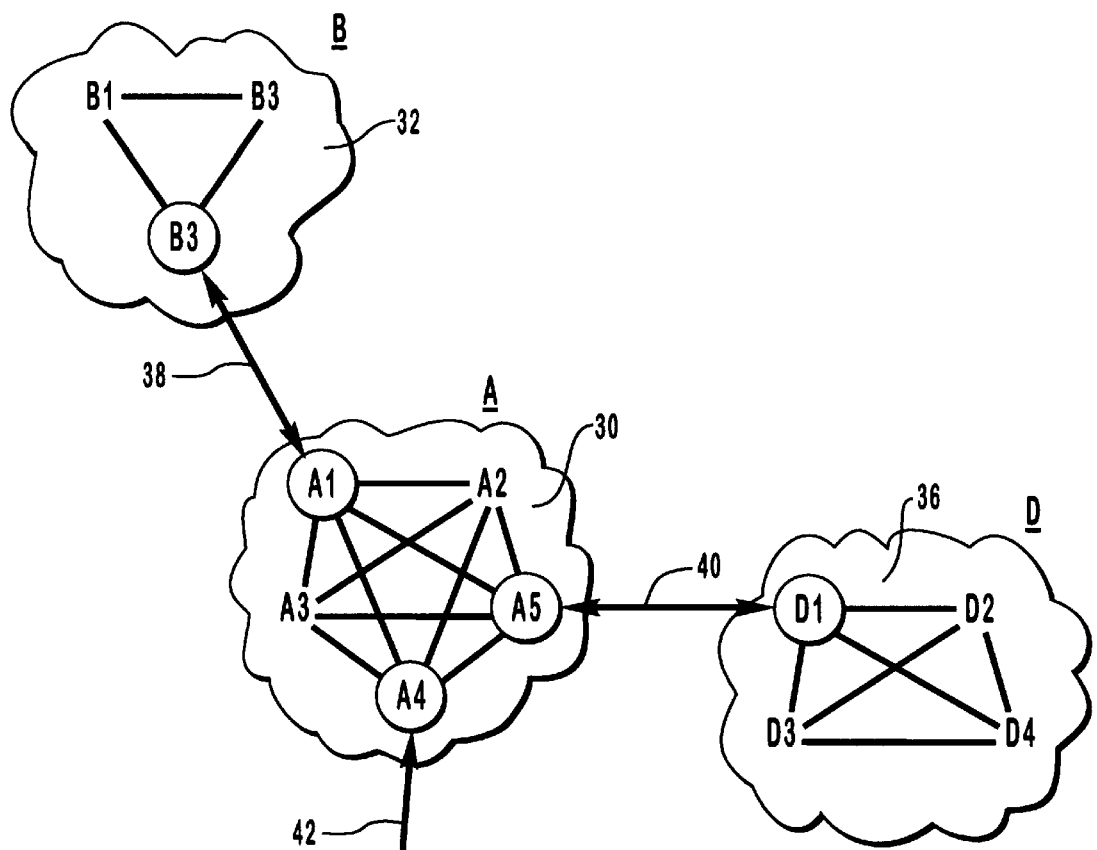
FIG. 1 is a logical connectivity diagram of servers used in implementing a Directory Service showing groups of servers that are interconnected in a full-mesh configuration within a site and sites that are interconnected through bridgehead servers.

In the following detailed description, the present invention is described by using flow diagrams or structure diagrams to illustrate the processing or the structure that is presently preferred to implement the system and method of the present invention. Using this manner to present the present invention should not be construed as limiting of its scope.

Embodiments within the scope of the present invention also include articles of manufacture comprising program storage means and having encoded therein program code means. Such program storage means can be any available media which can be accessed by a general purpose or special purpose computer. By way of example, and not limitation, such program storage means can comprise RAM, ROM, EPROM, CD-ROM or other optical disk storage, magnetic disk storage or other magnetic storage devices, or any other media which can be used to store the desired program code means and which can be accessed by a general purpose or special purpose computer. Combinations of any of these example program storage means are also contemplated within the scope of this invention. Program code means comprises, for example, executable instructions and data which cause a general purpose or special purpose computer to perform a specific function or functions.

As used herein, the terms "Directory Service Agent" or "DSA," "naming context," and "Directory Service" shall have the meanings set forth in the X.500 specification document; which is hereby incorporated by reference. While many types of DSAs are available, computer server systems that provide the Directory Service to individual client computers is used throughout by example to illustrate the present invention.

The term "site" refers to an area of good conductivity wherein each DSA or server is able to directly access each and every other DSA or server within the region. In this manner, full-mesh replication may be readily attained without any undue performance consequences.

The term "configuration information" refers to information regarding the location and identification of the site, and includes but is not limited to a list of all servers found within the site. "Intrasite replication information" is the necessary set of information to ensure that all naming contexts are replicated throughout the full mesh replication scheme of the site. This information is unique to each naming context on each DSA or server within the site and may be represented as a list of other DSAs or servers to which the naming context is replicated to or from which the naming context is replicated.

"Intersite connection information" or "connection information" refers to the necessary information to create unidirectional intersite links that allow replication changes to flow between sites only one time. Taken together, configuration information, intrasite replication information, and intersite connection information is collectively known as "replication topology information." In the context of a Directory Services implementation according to the X.500 standard, "knowledge" or "glue" is a specific implementation of replication topology information.

FIG. 1 shows in a hypothetical network sites A, B, C and D represented by the server computers enclosed within clouds 30, 32, 34 and 36 respectively. Within each site A-D respectively, are a group of servers that are interconnected in a full-mesh topology (e.g., each server in the site has a direct logical connection to each and every other server in that site). Each server is designated by the site letter followed by a number (e.g., A1, C3, etc.) uniquely identifying the server and the site to which it pertains. Specific servers within a site that are designated for communicating with other sites to form intersite connections are known as bridgehead servers and are represented throughout the logical connectivity diagrams by being circled. For example, the intersite connection between site A and B as represented by intersite connection path 38 is between bridgehead servers A1 and B3. In like manner the intersite connection between site A and site D is represented by intersite connection path 40 between bridgehead servers A5 and D1 while the intersite connection between site A and site C is represented by intersite connection path 42 between bridgehead servers A4 and C1.

Since each server within a site can communicate directly with each and every other server within that site, a full-mesh replication scheme is implemented within the site represented by the solid connection lines that connect each and every server one to another. The Directory Service replication mechanism will automatically propagate any directory object modification events (i.e., additions, deletions, and modifications) to each and every replica found within the site and through the intersite connections onto other sites.

The present invention deals with setting up and maintaining the "knowledge" (i.e., replication topology information) regarding replication connectivity and topology correctly so that the replication mechanism, whatever it may be, operates properly. Those skilled in the art will recognize and appreciate that many replication schemes could be used in connection with this invention.

Figure 2A:
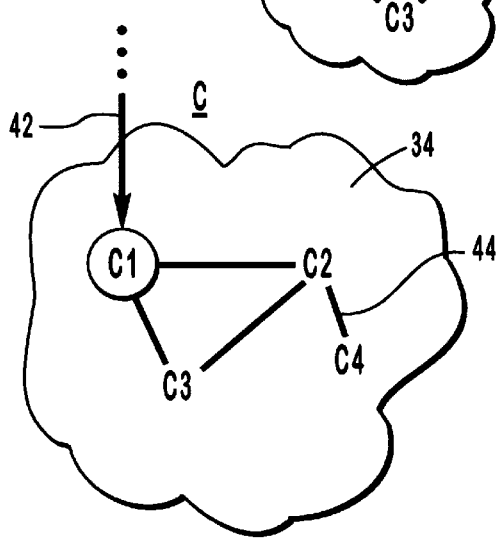
FIGS. 2A and 2B are logical connectivity diagrams of the Directory Service implementation of FIG. 1 showing the addition of a new server to an existing site.
Figure 2B:
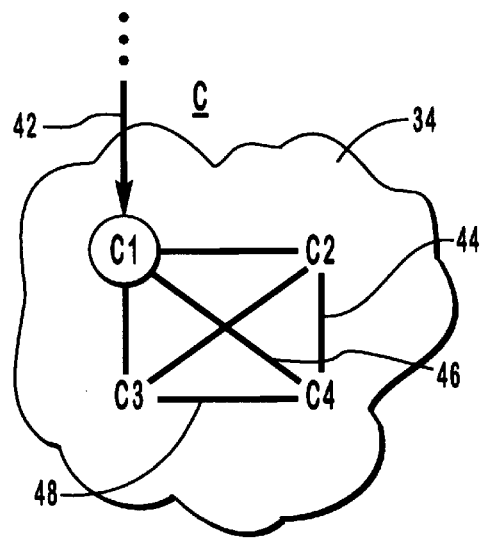
Figure 3A:
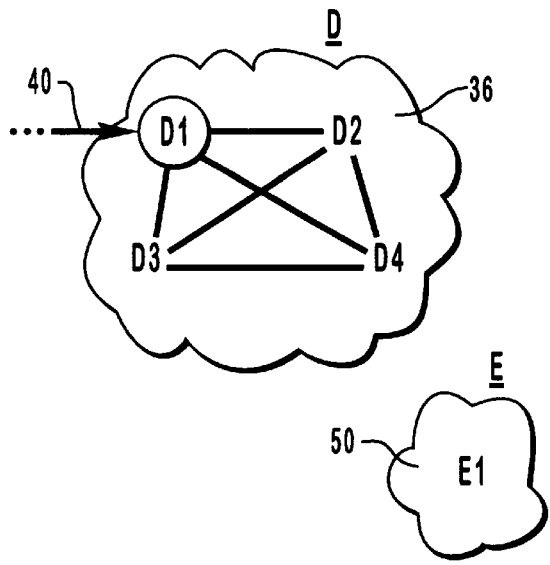
FIGS. 3A–3C is a logical connectivity diagram of the Directory Service implementation of FIG. 1 showing the addition of a new site.
Figure 3B:
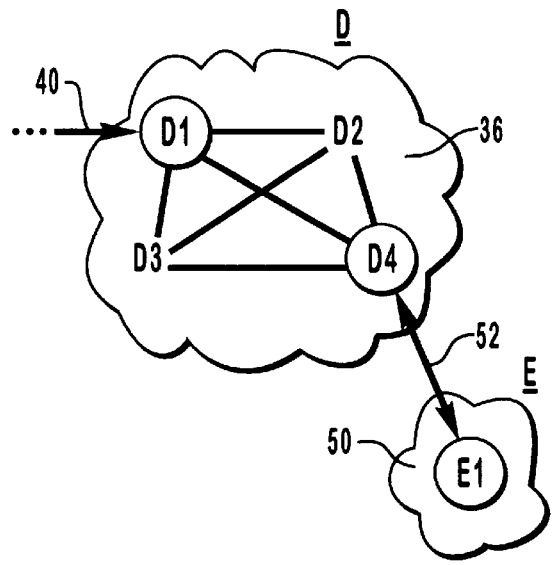
Figure 3C:
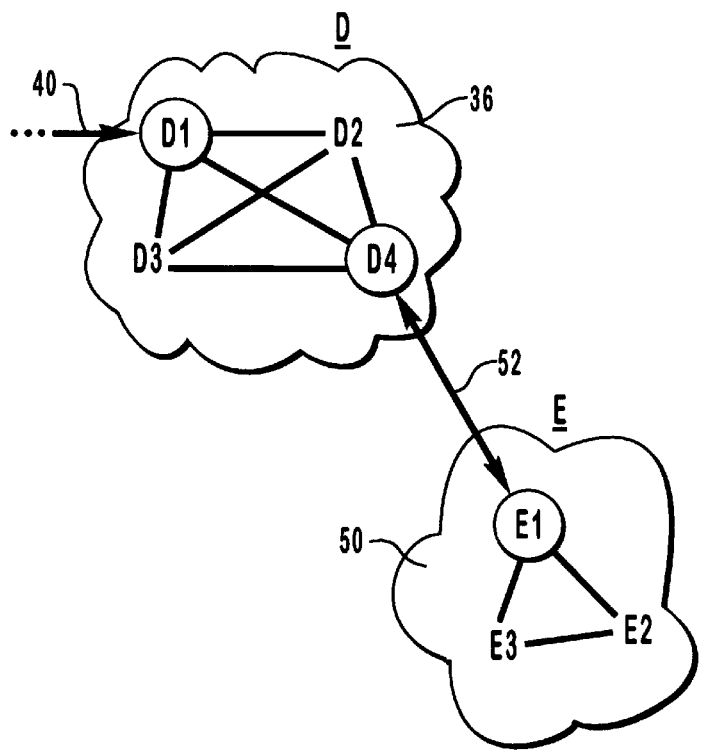
Figure 4:
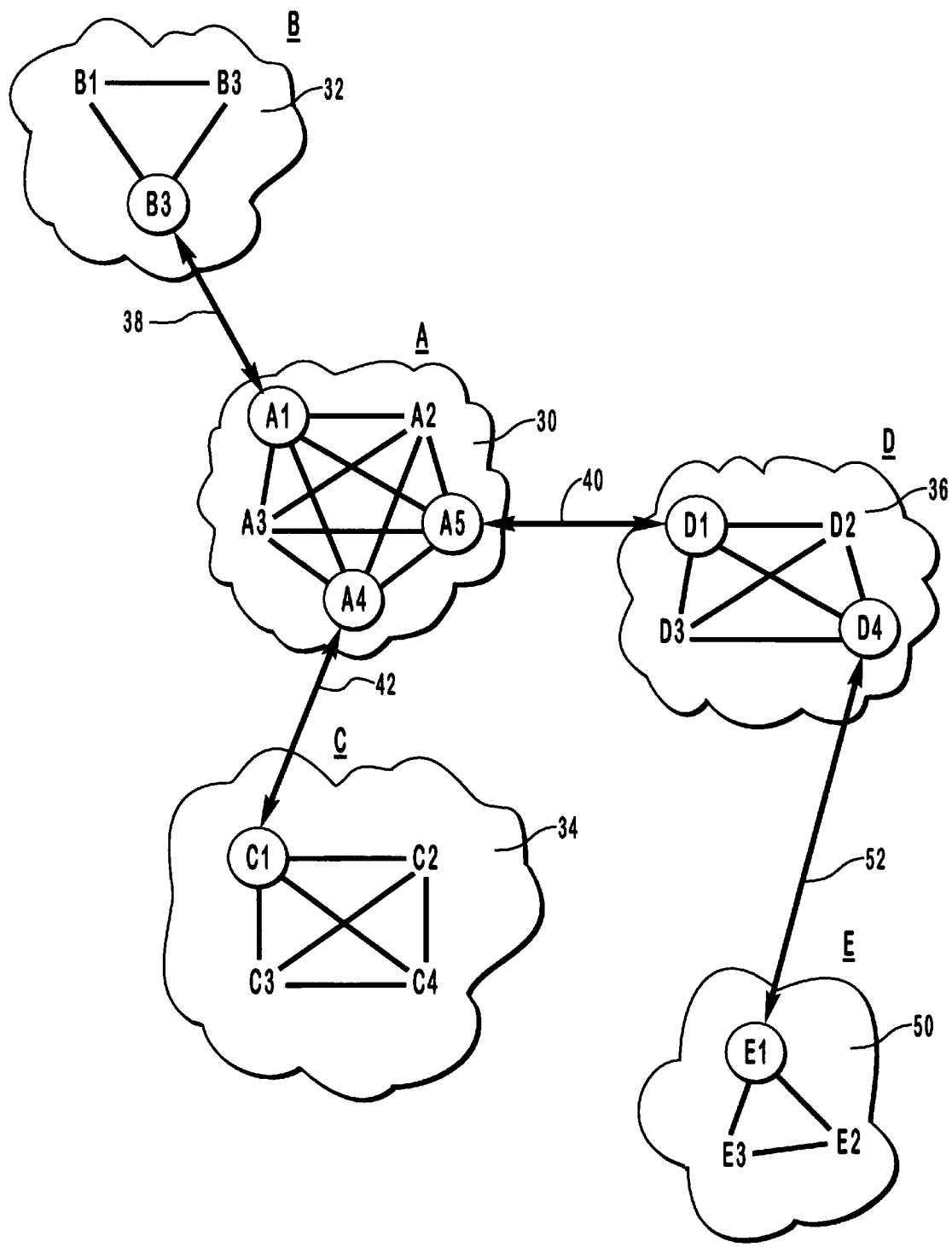
FIG. 4 is a logical connectivity diagram of the Directory Service of FIG. 1 showing the replication topology after server C4 has been added to existing site C and the new site E has been connected into the Directory Service.

FIG. 4 shows the network of FIG. 1 expanded to include a new site E represented by cloud 50, an intersite connection between servers D4 and E1 represented by intersite connection path 52, and the addition of server C4 to site C as encompassed by cloud 34. The process of adding the new server C4 to site C is represented by FIGS. 2A and 2B and will be explained hereafter. Likewise, the addition of site E is graphically represented in FIGS. 3A–3C and will also be explained hereafter.

FIG. 2A shows the logical connectivity of the network after the install program has been run and the new server C4 is aware of the existing server C2 as represented by connection path 44. After the knowledge consistency checker runs on new server C4 and existing servers C1–C3, the replication topology is set up so that the replication mechanism will be able to assure full-mesh replication among all servers C1–C4 at site C. This necessitates the creation of paths 44, 46, and 48 as shown in FIG. 2B.

Figure 8A:
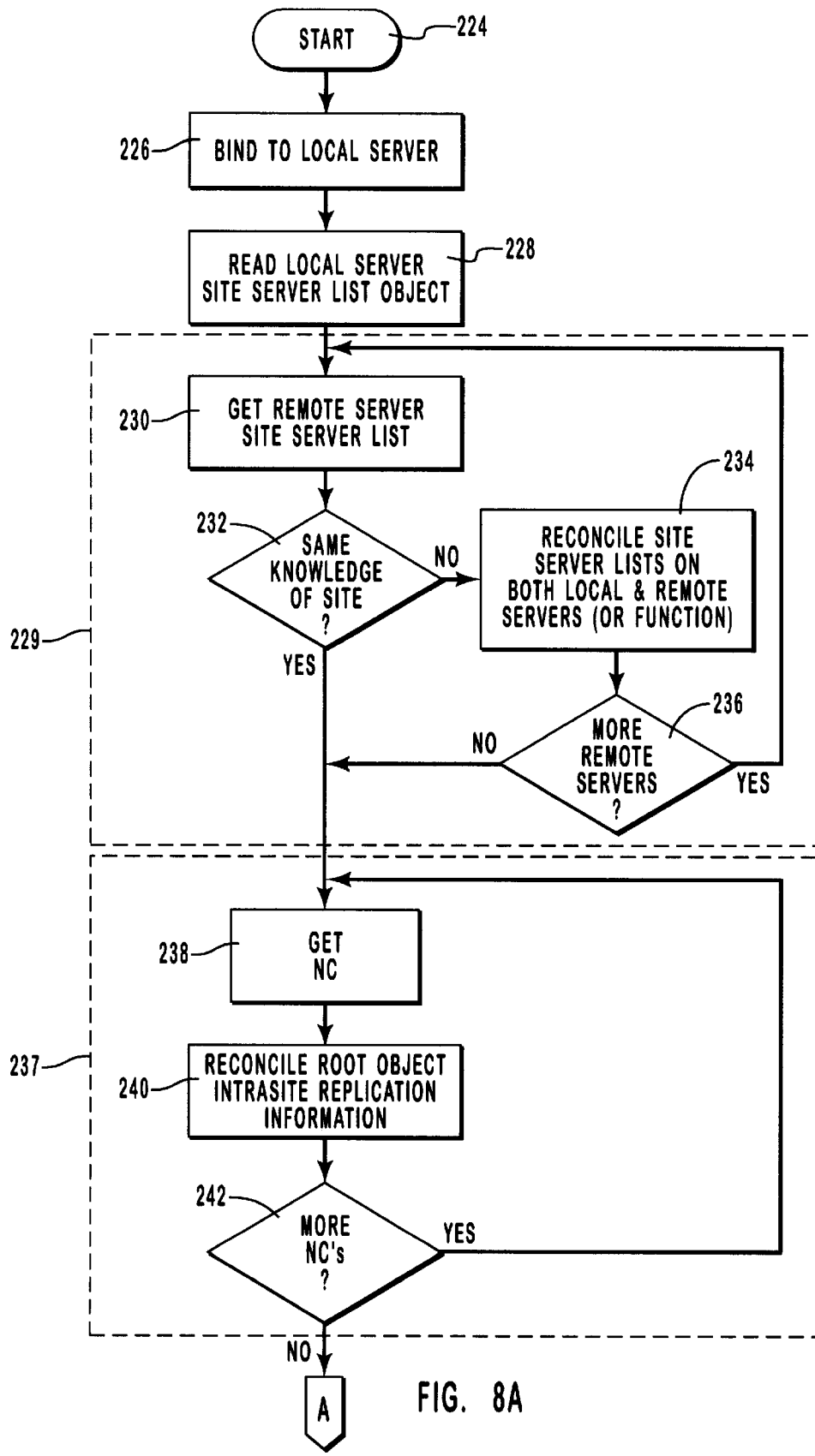
FIGS. 8A–8C are a flow chart showing the logical flow of a knowledge consistency checker that runs on each server.
Figure 8B:
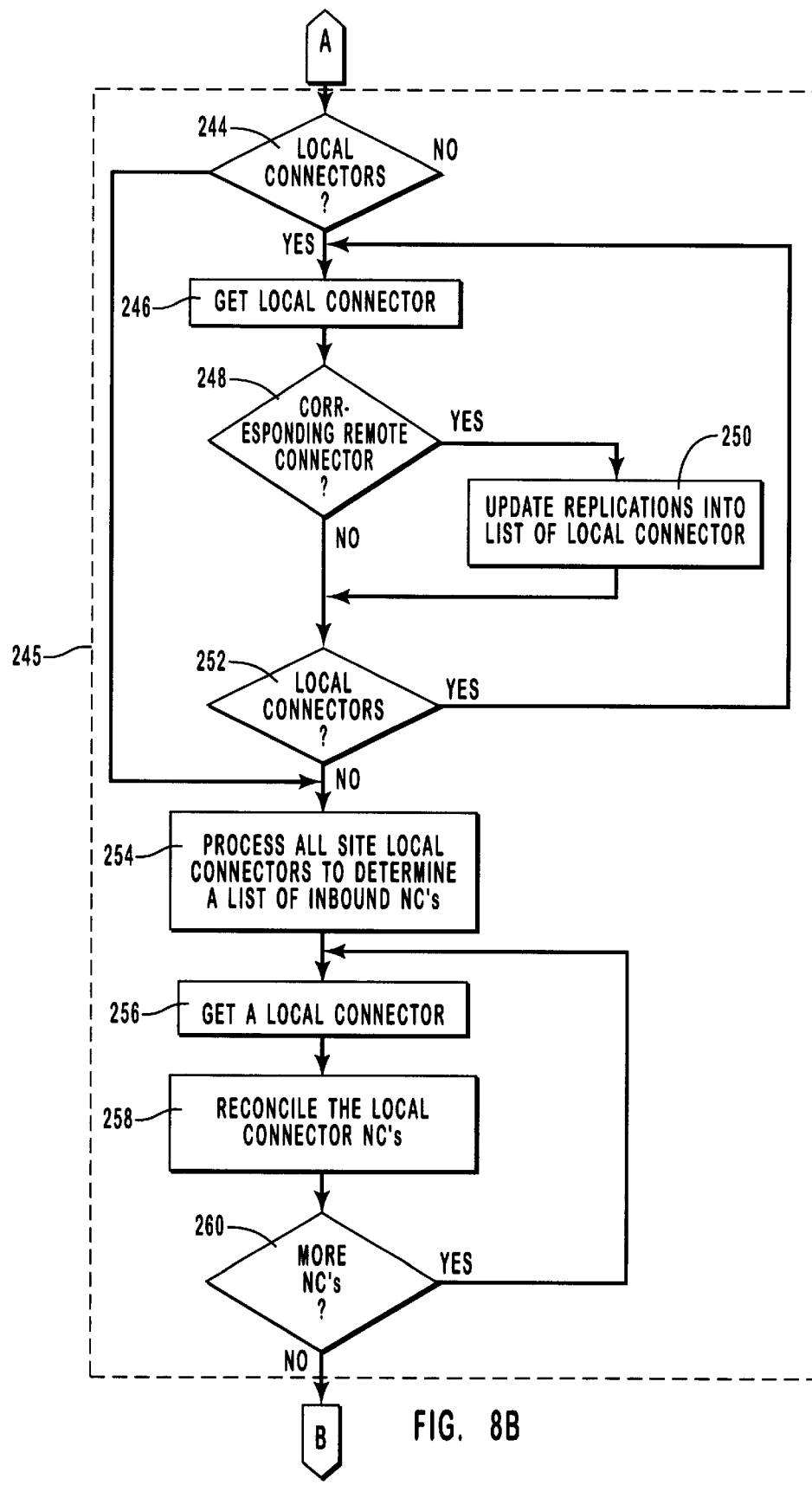
Figure 8C:
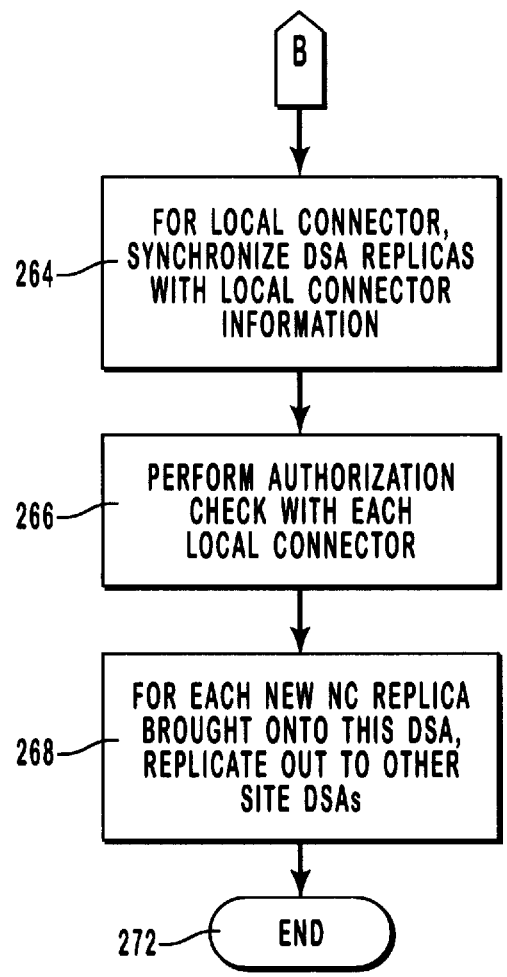
Figure 9:
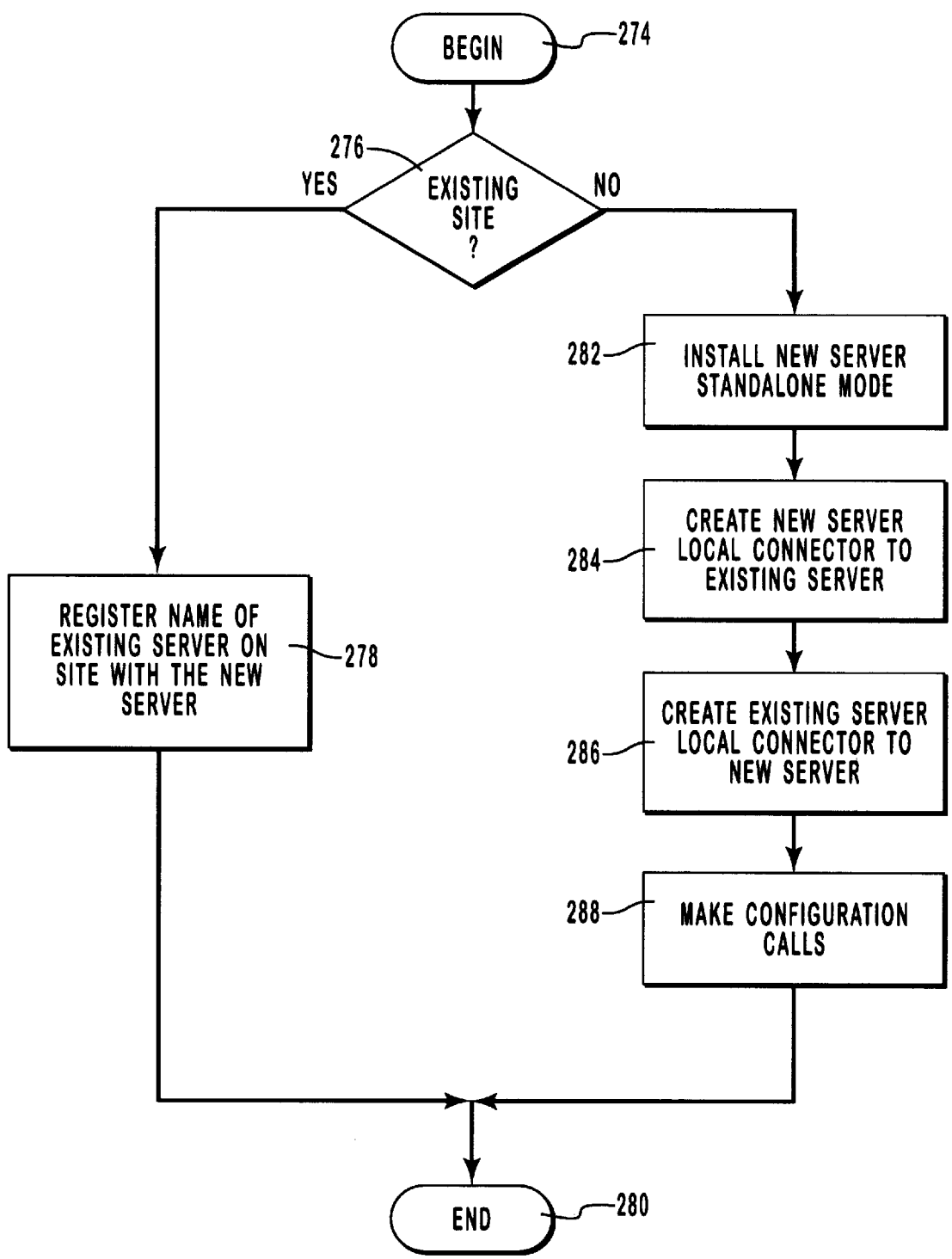
FIG. 9 is a flow chart showing the minimal operation of an install program that places the system in a state where the knowledge consistency checker can then automatically maintain the replication topology information within a site as well as pass appropriate knowledge intersite using the replication mechanism.

To illustrate the mechanics of the installation of the new server C4, reference is now made to server installation program flow chart in FIG. 9, the knowledge consistency checker flow chart in FIGS. 8A–8C, and the logical diagrams 6A–6G showing how and when the contents of the objects change in order to accomplish the full-mesh replication topology between all servers C1–C4. In order to fully understand FIGS. 6A–6G, a more basic explanation of naming contexts is first undertaken in connection with FIGS. 5A and 5B.

Figure 5A:
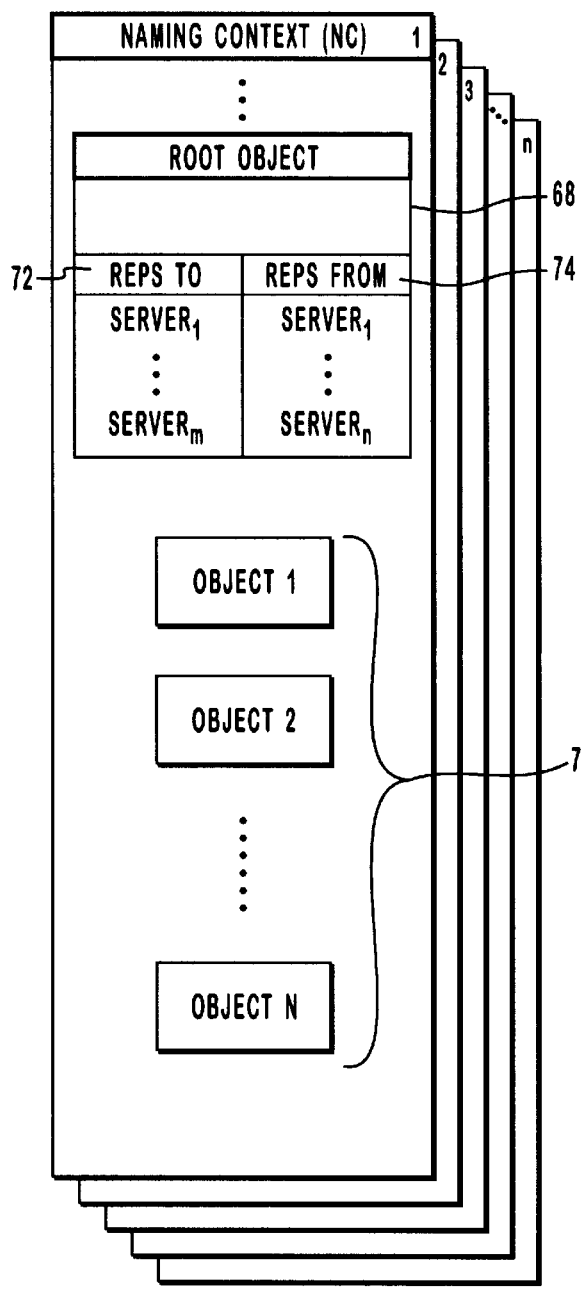
FIGS. 5A and 5B are general logical diagrams of naming contexts.

FIG. 5A shows a plurality of naming contexts as found replicated and distributed among a plurality of servers as part of a Directory Service implementation. A naming context is the minimum unit of replication and if any object within a naming context is modified, deleted, or added, the replication mechanism will initiate replication to bring all replicas of the naming context in synchronization. In order to minimize network traffic, it is common to create replication paths wherein each replicated object (e.g., a naming context) is replicated to a list of servers and is replicated from a list of servers, the two lists being complementary to one another so that all servers in the site are listed in one list or the other (except the server where the lists reside). Each replicated naming context, residing on each of the servers on the site, will have a unique "RepsTo" list and a unique "RepsFrom" list. In this sense, the intersite replication information must be unique on each server for each naming context contained therein and the same naming context residing on different servers will have corresponding differences in their respective RepsTo list and RepsFrom list.

It is one purpose of the knowledge consistency checker to rectify any discrepancies as servers are added and deleted throughout the system or new naming contexts are replicated onto a given server. Furthermore, the knowledge consistency checker will ensure that each server on the site will be in one list or the other and that a server does not exist simultaneously on both lists.

One way to associate this intrasite replication information or portion of "knowledge" with a particular naming context is to create a root object within that naming context that contains this information. Those skilled in the art may also see other ways to represent, store, and propagate such information Therefore, the plurality of naming contexts shown in FIG. 5A each have a root object 68 that will be unique on each server where the NC resides, that contains a RepsTo list 72 of servers to which the naming context is replicated to, and contains a RepsFrom list 74 indicating the servers that the naming context is replicated from. Further, a plurality of objects 70 are identically replicated regardless of which server the naming context may be located.

Figure 5B:
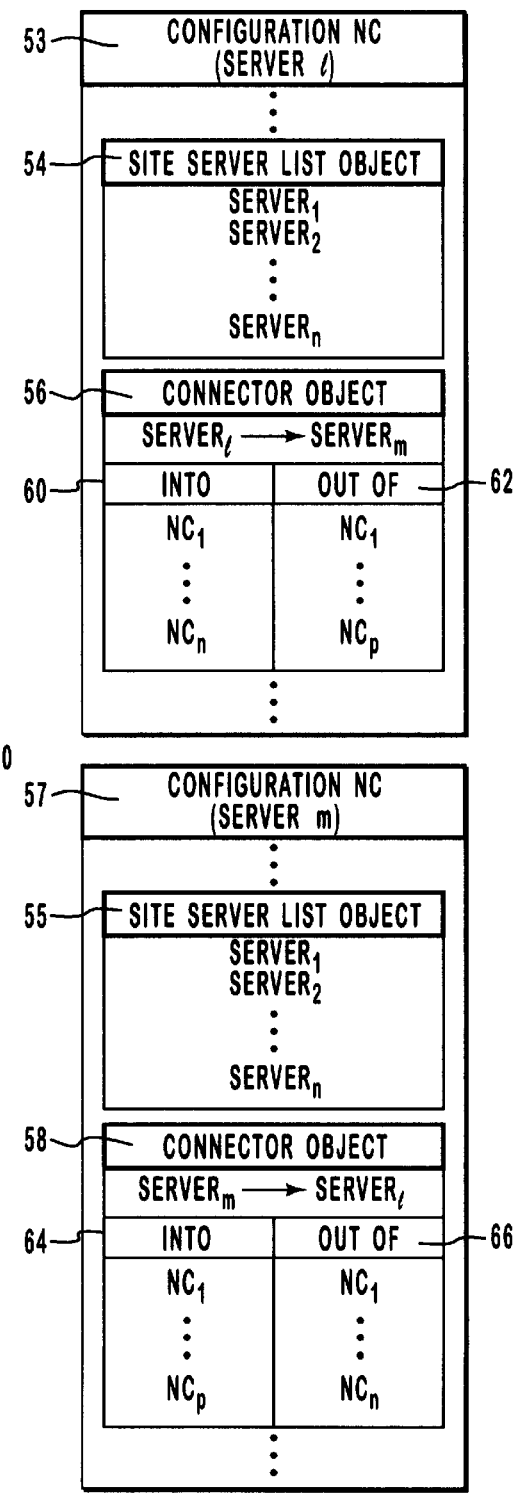

FIG. 5B shows a pair of naming contexts containing connector objects that define an intersite connection. Each naming context is a special kind of naming context, a configuration naming context, that has special objects that are used for site configuration information and for intersite connection information. Further, a configuration context is site specific (i.e., each site has a separate configuration naming context and it is writable only by servers on that site) and is located for easy access by a knowledge consistency checker. Specifically, the configuration naming context 53, pertaining to site 1, has a site server list object 54 containing a list of all the servers located on the site. This list of servers will need to be modified as servers are added or removed from the site and the knowledge consistency checker will compare the site server list objects on a number of different servers in order to assure that all server changes are propagated to all site server list objects. Also shown is connector object 56, local to server 1, that is a unidirectional link to the remote server m.

Also shown is the corresponding configuration naming context 57 that pertains to another site and resides on server m (as well as all other respective site servers). Contained therein is a site server list object 55 for the servers in the other site and connector object 58.

Connector objects 56 and 58 taken together serve to define an intersite connection. Connector object 56 is between hypothetical server$_l$ to server$_m$ while the connector object 58 is in the opposite direction or from server$_m$ to server$_l$. The servers signified in the connector objects, namely server$_l$ and server$_m$, are known as bridgehead servers because they will communicate replication changes between the sites and are the only server that will do so.

Both connector objects 56 and 58 have a list of naming contexts that are replicated into the site and replicated out of the site. For a complementary pair of connector objects, such as connector objects 56 and 58, these lists of naming contexts will also be complementary (i.e., the "InTo" list of one connector object will be the OutOf" list of the other connector object and vice versa). This can be readily noted since connector object 56 has naming contexts $NC_1$–$NC_n$ in the InTo list 60 while the same naming contexts $NC_1$–$NC_n$ are found in the OutOf list 66 of connector object 58. Similarly, the naming contexts $NC_1$–$NC_p$ are found in the OutOf list 62 of connector object 56 and in the InTo list 64 of connector object 58. Though the installation program initially creates the connector objects 56 and 58, it is the responsibility of the knowledge consistency checker running independently on the respective servers to modify the connector objects as appropriate to ensure logical consistency with dynamic system changes such as adding or deleting servers, manipulating the naming contexts (adding, deleting, or modifying), etc.

In order for the knowledge consistency checker to read a "remote" connector object so that the "local" connector object may be modified, the "remote" configuration naming context must be replicated onto the local server (i.e., where the knowledge consistency checker is running). Generally, as used herein, reference to a configuration naming context will refer to the "local" configuration naming context.

Figure 6A:
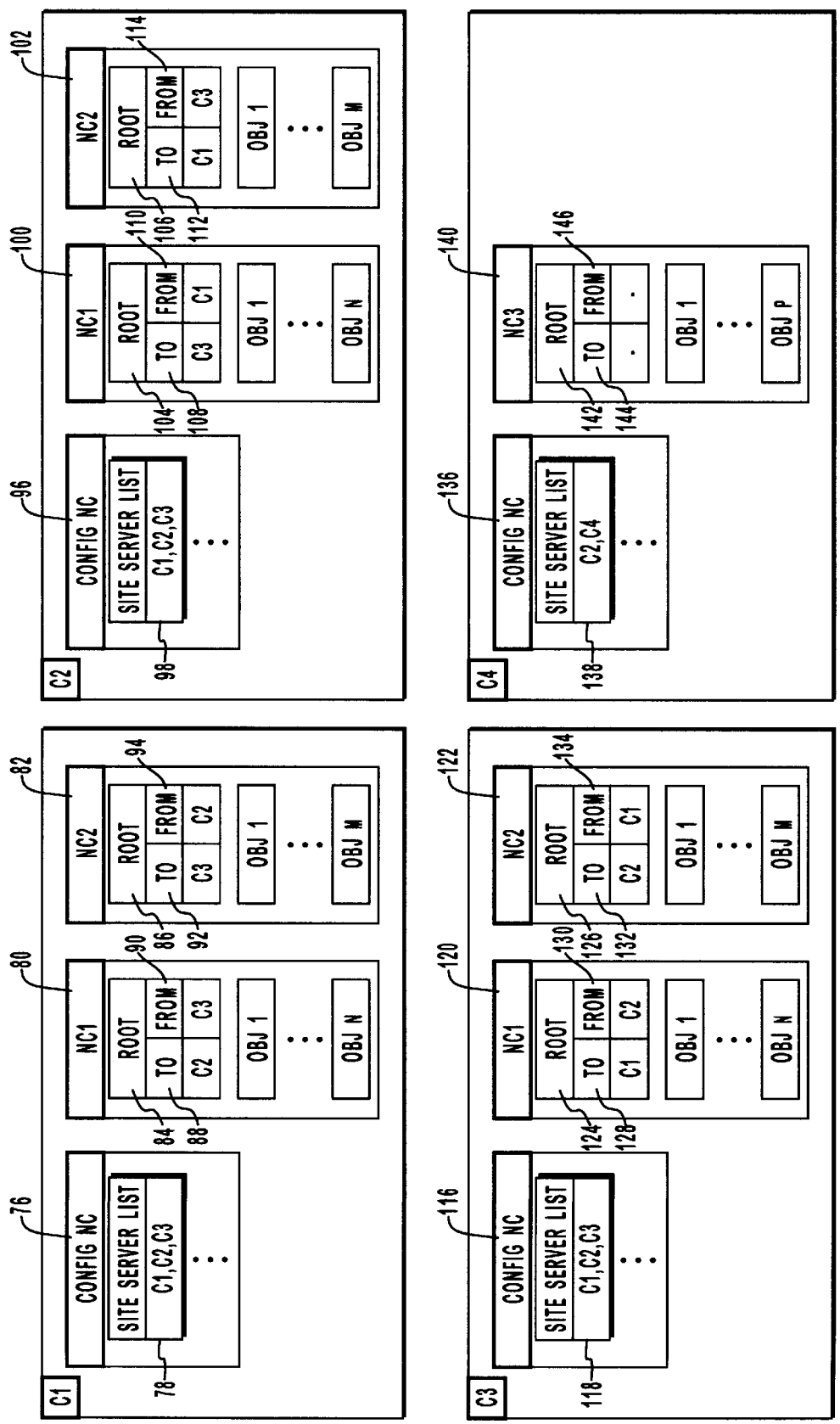
FIGS. 6A–6G are logical diagrams showing the progression of change within the configuration naming contexts, and the root objects of naming contexts NC1–NC3 on servers C1–C4 as server C4 is added to the Directory Service.

Referring now to FIG. 9, a flowchart of the installation program is presented that indicates the steps taken for adding a new server onto an existing site or adding a new site to the directory. After initializing and starting the program at step 274, whether this is an existing site is determined as step 276. Since C4 is being added to an existing site, only one name of an existing server need be registered with the new server and this occurs at step 278. From this information the normal replication mechanism and the knowledge consistency checkers running independently on each of servers C1–C4 will then automatically configure the system and make all intersite replication information and configuration information adjustments in order to allow the replication mechanism to function properly. The installation program is substantially finished and does standard post processing before ending at step 280. At this point, the state of each server C1–C4 is shown in FIG. 6A. For this example, existing servers C1–C3 have two naming contexts, $NC_1$ and $NC_2$, replicated on each server while the new server C4 has a new naming context NC.

Server C1 has a configuration naming context 76 having a site server list object 78 indicating the three existing servers C1–C3 that existed prior to the addition of the new server C4. Further, the naming contexts NC1 80 and NC2 82 having root objects 84 and 86, respectively, which indicate where the respective naming contexts RepsTo and Reps-From. As shown, the RepsTo list 88 for NC1 80 includes or indicates server C2 and the RepsFrom list indicates C3. Similarly, the RepsTo list of the root object 86 of NC2 82 indicates server C3 and the RepsFrom list 94 indicates server C2.

Server C2 also has a configuration naming context 96 with a site server list object 98 having the same three servers C1–C3. Further, the naming contexts NC1 100 and NC2 102 having root objects 104 and 106 respectively, reside thereon. However, the RepsTo list 108 of root object 104 indicates C3 and the RepsFrom list 110 of the root object 104 indicates C1. Also the RepsTo list 112 of the root object 106 of NC2 102 indicate C1 while the RepsFrom list 114 indicates C3. The RepsTo list and RepsFrom list of server C2 are different from that of server C1 though entirely consistent with the system topology.

Server C3 follows the same pattern with the configuration naming context 116 having the site server list 118 containing server C1–C3 and NC1 120 and NC2 122 with respective root objects 124 and 126. Again, the corresponding RepsTo lists and RepsFrom lists are different. Specifically, the RepsTo list 128 of root object 124 of $NC_1$ 120 indicates server C1 while the complementary RepsFrom list 130 indicates server C2. Similarly, the RepsTo list 132 of root object 126 in NC2 122 indicates server C2 and the RepsFrom list 134 indicates server C1.

Server C4, the new server, has a configuration naming context 136 with a site server list 138 containing the server indicated by the install program, server C2, as well as itself, server C4. Also, C4 has a new naming context that will eventually be replicated across the entire site. NC3 140 has root object 142 having a RepsTo list 144 and a RepsFrom list 146. It is the responsibility of the knowledge consistency checker to start with this given information in FIG. 6A and rectify the configuration information and the intersite replication information (i.e., site server list, RepsTo lists, and RepsFrom lists) to arrive at consistent replication topology information so that the replication mechanism will work properly. This final state is shown in FIG. 6G, and FIGS. 6B–6F show operation of the knowledge consistency checkers running independently on servers C1–C4 as well as operation of the replication mechanism). Referring to the flowchart of the knowledge consistency checker as shown in FIG. 8A, the operation of the knowledge consistency checker will be correlated with the actual changes made in the servers in FIG. 6B–6G. The knowledge consistency checker running on server C4 starts at step 224 and becomes initialized. It may be noted that the knowledge consistency checker is run frequently as the state of the network is or can be constantly changing due to additions or deletions of servers by the system administrators. The knowledge consistency checker binds or connects itself with the server C4 at step 226.

Next, the site server list object on the local server is read at step 228 to determine what other servers exist within the site as currently known by server C4. As read from the site server list object 138 for server C4, this would indicate servers C2 and C4. Each server on this list other than the local server itself (e.g., server C4 at this point) will be read to compare the individual site server lists and bring them into harmony or synchronization.

This is represented by the steps encircled by box 229. A site server list on the remote server is retrieved at step 230 and is compared to the site server list on the local server to determine if the knowledge of the site is the same between the two servers. The designated remote site server list is compared to the local site server list to determine if they are equivalent by step 232. If not, the site server lists on both the local and remote server are reconciled at step 234. This is done by "Or-ing" (e.g., performing a boolean logic "OR" operation) the server lists together so that they will become the same and have all the same servers listed.

Figure 6B:
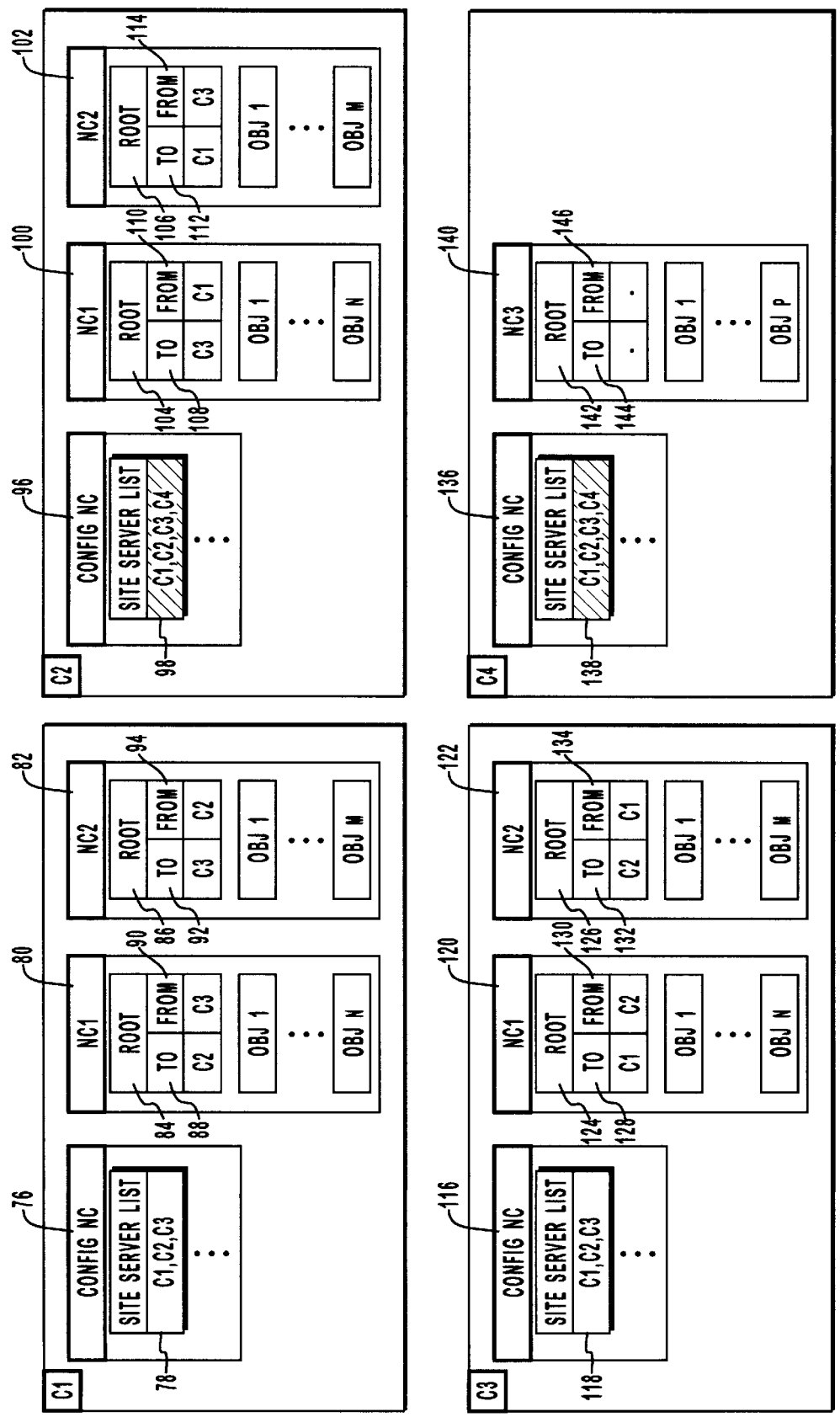
Figure 6C:
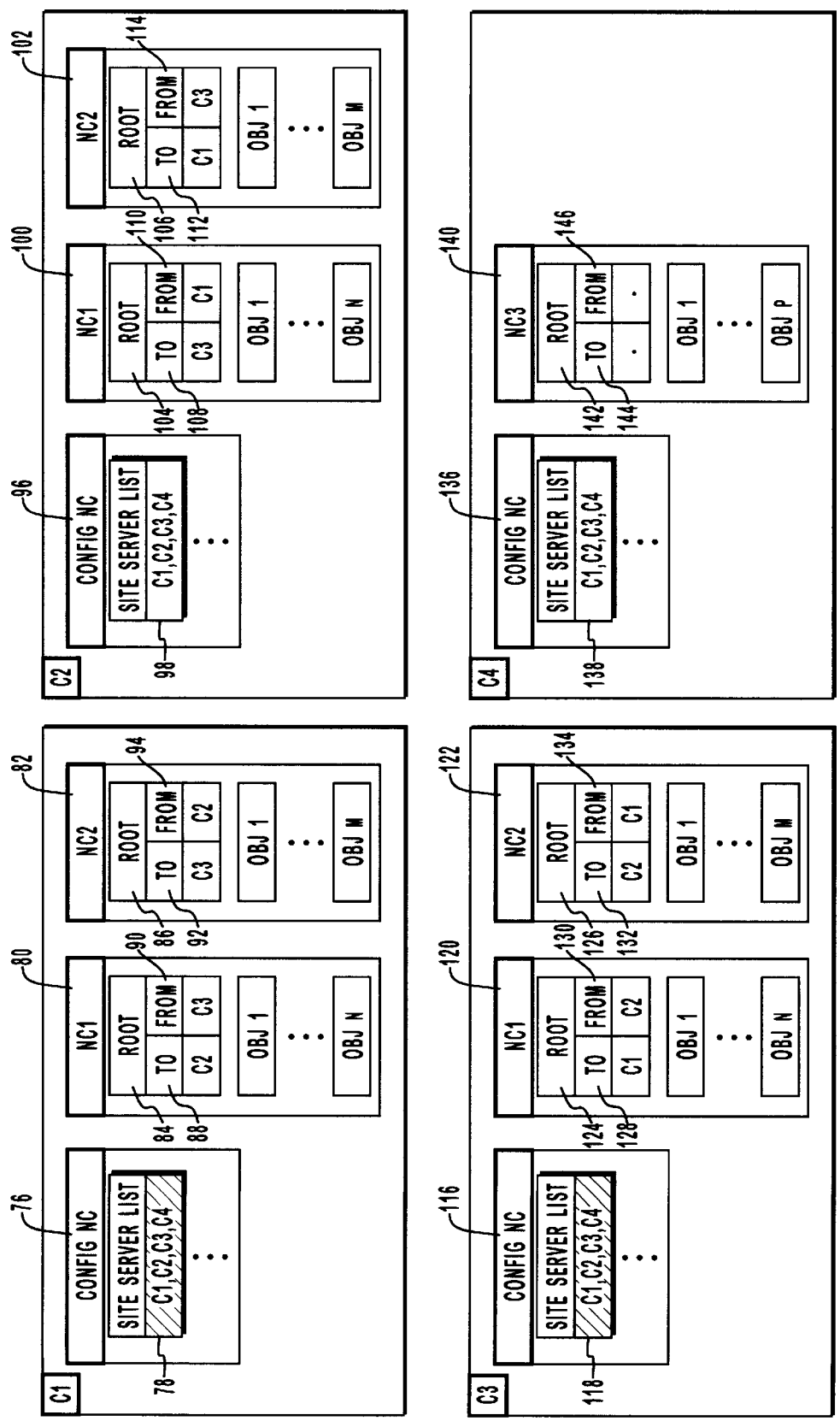

This is shown in FIG. 6B where servers C1–C3 found in site server list object 98 on server C2 is OR-ed with C1 and C2 found in the site server list object 138 located on server C4 to generate a list of servers C1–C4 that then replaces the contents of site server lists 98 and 138, respectively, as shown in the highlighted region of FIG. 6B. This also adds servers C1 and C3 to the list of remote servers that need to be checked for consistency by the knowledge consistency checker running on server C4.

At step 236 the knowledge consistency checker determines whether more remote servers need to be contacted in order to reconcile the site server lists. The reconciliation will continue until either the same knowledge is found at a site as determined at step 232 or there are no more remote servers to contact as determined at step 236. In the example of adding server C4 to the network, servers C1 and C3 would be contacted and their respected site server list objects 78 and 118 would be modified to include the new server C4 by the knowledge consistency checker running on server C4 as shown by the highlighted portions in FIG. 6C.

Next, the knowledge consistency checker will reconcile all of the naming contexts currently found on the particular server. The steps required to accomplish this are contained within box 237 and begins by getting a writable naming context at step 238. The root object intersite replication information is reconciled at step 240 so that every server on the site appears either in the RepsTo or the RepsFrom list of the root object. At step 242, the knowledge consistency checker determines whether any more NCs need to be processed.

Figure 6D:
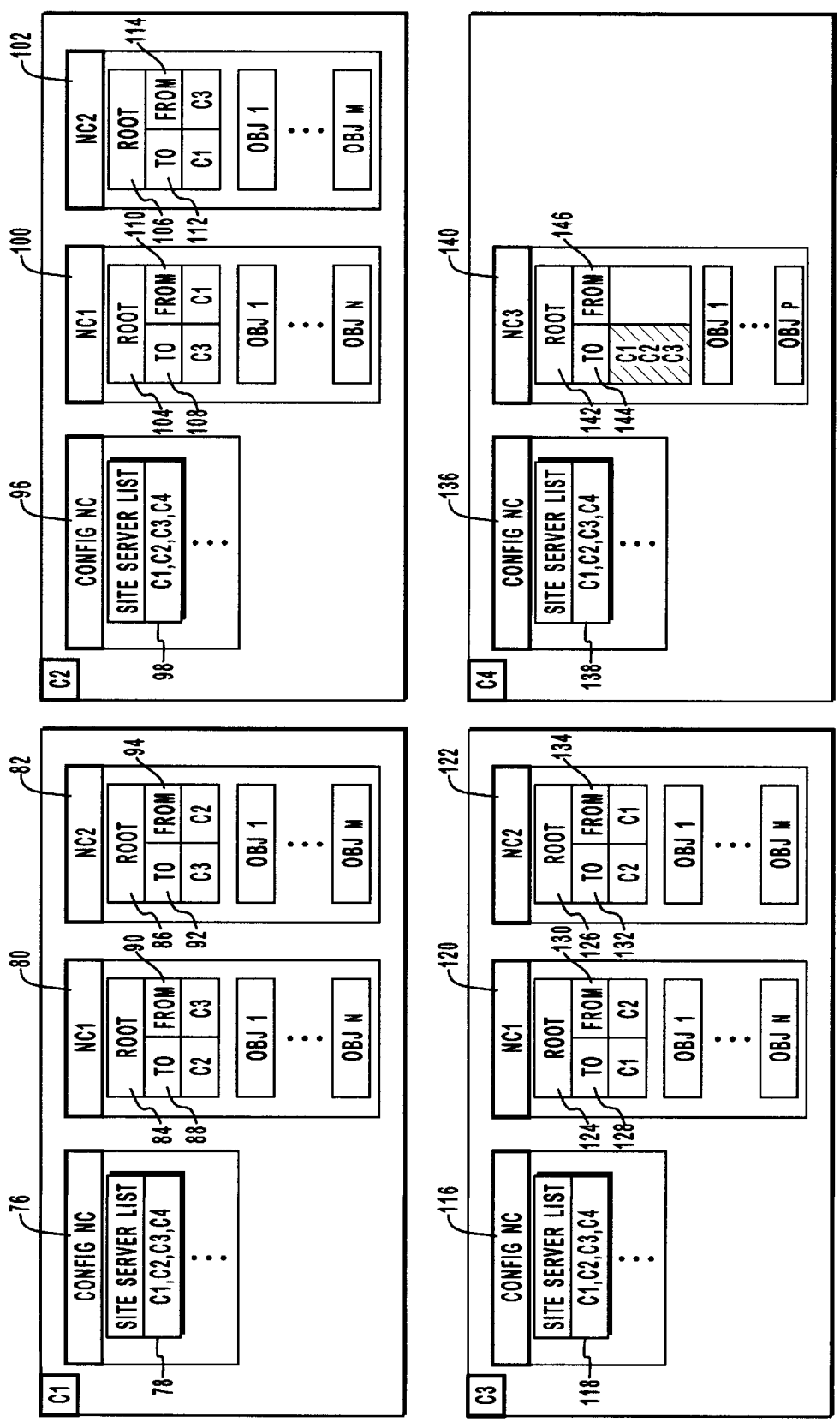

FIG. 6D shows that the knowledge consistency checker running on C4 would process the only naming context found thereon, namely NC3 140. The RepsTo list is modified so that NC will replicate out to existing servers C1–C3 as shown in the highlighted portion of FIG. 6D.

Those skilled in the art will note that many different forms and algorithms may be used to place the given servers of a site onto a RepsTo or a RepsFrom list. Further, some schemes may have a "balancing" mechanism so that the RepsTo and RepsFrom list are relatively equal or eventually become equal by successive iterations of the knowledge consistency checker. An important aspect that the knowledge consistency checker performs in the full-mesh replication topology for the site in this exemplary embodiment is to ensure that all site servers other than the local server (i.e., where the knowledge consistency checker is running) are listed or indicated in one of the two lists.

Figure 6E:
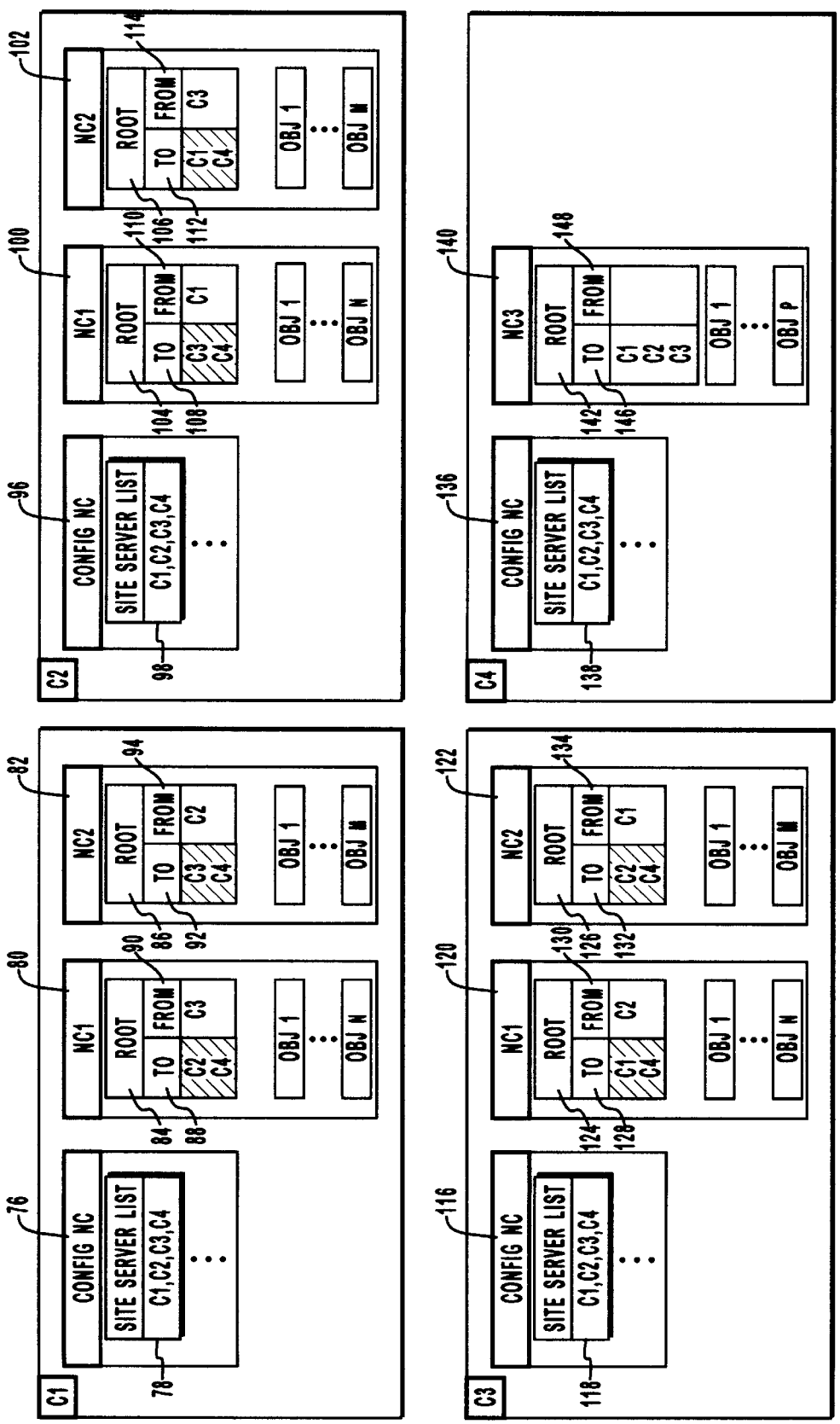

FIG. 6E shows the results of a knowledge consistency checker running on each of servers C1–C3 independently. In each case, the server C4 is added to a respective RepsTo or RepsFrom list for each naming context root object as shown by the highlighted portions. Specifically, server C4 is added to RepsTo list 88, 92, 108, 112, 128 and 132.

Figure 6F:
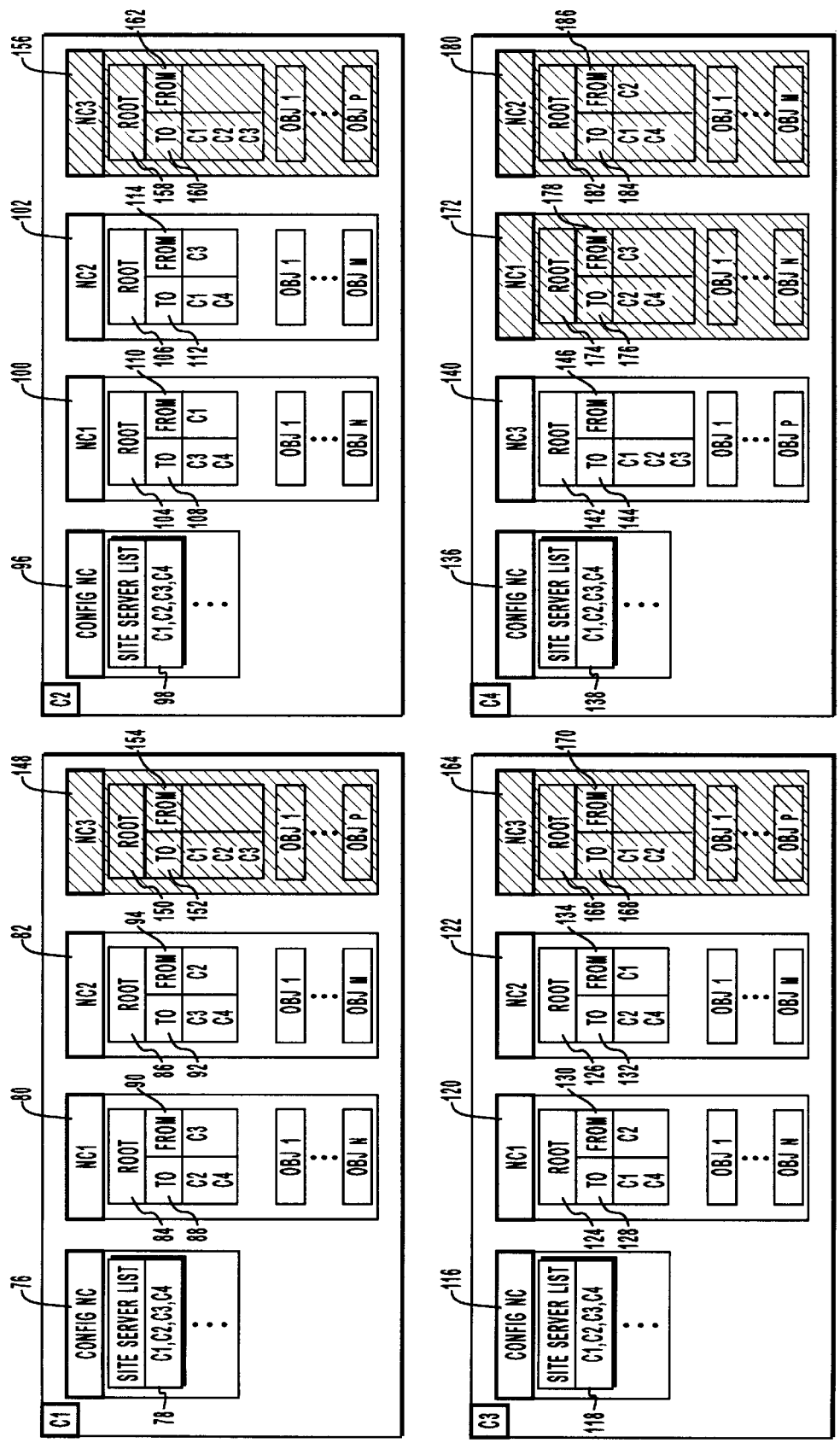

At this point, the new server C4 is known as part of the configuration information for all the servers on the site (C1–C3) and is in the intrasite replication information (i.e., within the unique root objects of every naming context on every server). The replication mechanism is then able to replicate the non-existent naming contexts to the respective servers. Namely, replicas of the naming context NC3 from the new server C4 are replicated to the existing servers C1–C3, and replicas of the naming contexts NC1 and NC2 residing on existing servers C1–C3 are replicated onto the new server C4. The results of this replication are shown in highlighted portions of FIG. 6F. As illustrated in FIG. 6F, NC3 has been replicated onto server C1 as NC3 148 having root object 150 with a RepsTo list 152 and a RepsFrom list 154. Also, NC3 has been replicated from server C4 onto server C2 as a NC3 156 with root object 158 having RepsTo list 160 and RepsFrom list 162. Finally, NC3 has been replicated from server C4 to C3 as NC3 164 with root object 166 and having RepsTo list 168 and RepsFrom list 170. Conversely, a replica of NC1 has been replicated from server C1 to server C4 as NC1 172 having root object 174 with RepsTo list 176 and RepsFrom list 178. In like manner, a replica of NC2 has been replicated from server C2 onto server C4 as NC2 180 with root object 182 having a RepsTo list 184 and RepsFrom list 186.

Now that the replicas exist on each of the respective servers C1–C4, it is necessary for the knowledge consistency checker to run again on each of the four servers in order to reconcile the intrasite replication information found in the new replicas. Since they were initially copied verbatim, the root objects do not accurately indicate the intrasite replication information.

Figure 6G:
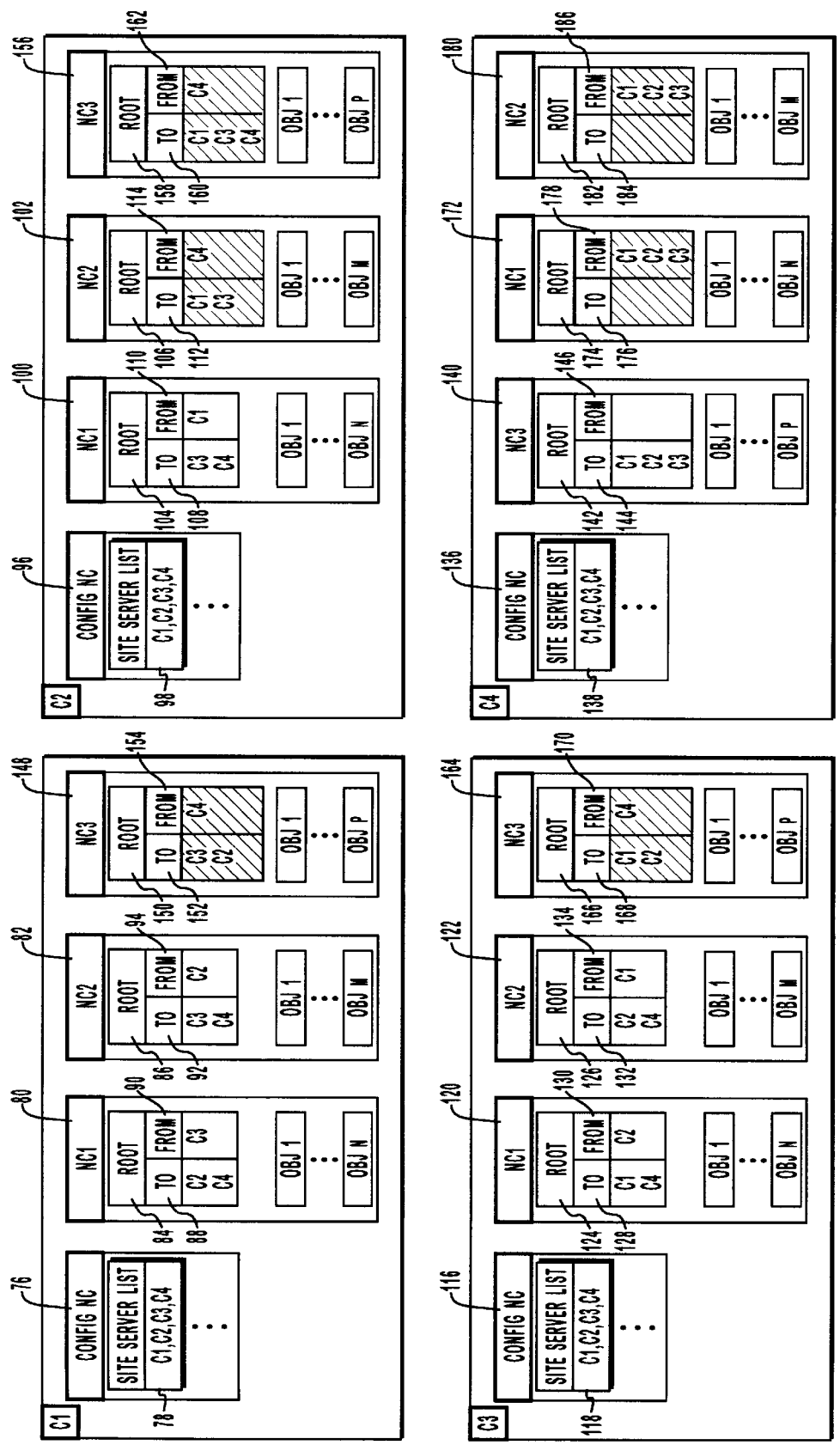

FIG. 6G shows the results of running the knowledge configuration checker independently on servers C1–C4 for reconciling the intrasite replication information. The highlighted portion shows the changes made in order to properly maintain the replication knowledge. The knowledge consistency checkers running independently on servers C1–C4 will reconcile the intrasite replication information as held in the root objects of the respective naming contexts. This occurs following the steps enclosed in box 237 of FIG. 8A in the manner explained previously in connection with FIG. 6D modifying naming context NC3 140 on server C4. Essentially, the server running the respective knowledge consistency checker is removed from the lists and the missing server is added.

FIGS. 7A–7D are logical diagrams showing the changes within the directory as stored on the respective servers D4 and E1 as a new site with an accompanying new naming context is added onto the network. This corresponds to the logical connection diagrams shown in FIGS. 3A and 3B. Once the intersite connection is accomplished, other servers may be added to the new site as shown in FIG. 3C in the manner described previously for the addition of server C4 to site C as shown in FIGS. 2A and 2B. In FIG. 3A, a new server E1 representing the initial server on a new site E encompassed by cloud 50 is brought up in stand alone mode to be logically connected into the system.

In FIG. 3B, an intersite connection represented by intersite connection path 52 is created by the install program. The flowchart of FIG. 9 shows the operation of the install program being initialized at step 274 and determining that a new site is being installed at step 276. The new server is installed in stand alone mode at step 282 which entails making the physical connections, if necessary, to make the server available on the physical network as well as all logical communication information so that asynchronous mail communication can occur with at least one existing server on an existing site.

Figure 7A:
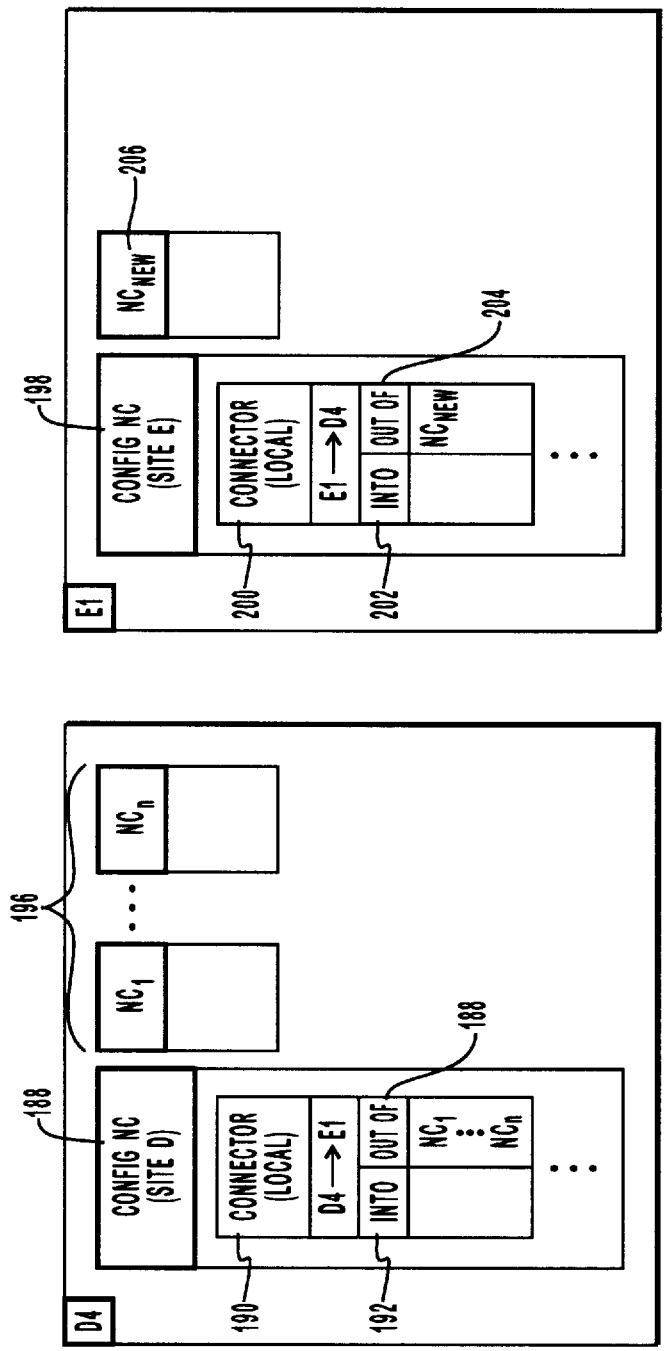
FIG. 7A–7D are logical diagrams showing the progression of the change on bridgehead servers D4 and E1 as an intersite link is created to bring site E into the Directory Service.

The install program takes as input the name of an existing server on another site in order to create the connector objects in the respective configuration naming context on the two bridgehead servers. At step 284, a local connector between the new server and the existing server is created and placed in the new server's configuration naming context. This step is illustrated in FIG. 7A where the new server E1 has a configuration naming context 198 having the newly created intersite connector object 200. The connector object 200 has an InTo list 202 listing the naming contexts that are replicated into the new server E1 and an OutOf list 204 listing the naming contexts that are replicated out of the new server E1 into the existing site as represented by bridgehead server D4. Initially, the InTo list 202 is empty and the OutOf list 204 contains the new naming context 206 that resides on the new server E1.

Referring to the flowchart in FIG. 9, a connector is created in the existing server indicating the connection between the existing server and the new server at step 286. This connector is local to the existing server, meaning that it pertains to that server and will normally be modified by the knowledge consistency checker running on that "local" server. The modifications made will be replicated in copies of the object that can be read by other knowledge consistency checkers to reconcile their respective "local" connector objects. Again, this is illustrated in FIG. 7A where the existing server D4 has a configuration naming context 188 containing the newly created intersite connector object 190 from the existing server D4 to the new server E1. Again, the connector object 190 has an InTo list 192 that is empty and an OutOf list 194 containing the naming contexts existing on the residing server D4, namely the plurality of naming contexts $NC_1$–$NC_n$ 196.

Finally, the installation program makes the necessary configuration calls at step 288 in order to allow replication of respective configuration naming contexts between the existing server D4 and the new server E1 as shown in the flow chart of FIG. 9. It may be noted that either the initial lists may be "filled out" by the install program (as explained here) or left empty for the knowledge consistency checker to handle.

Figure 7B:
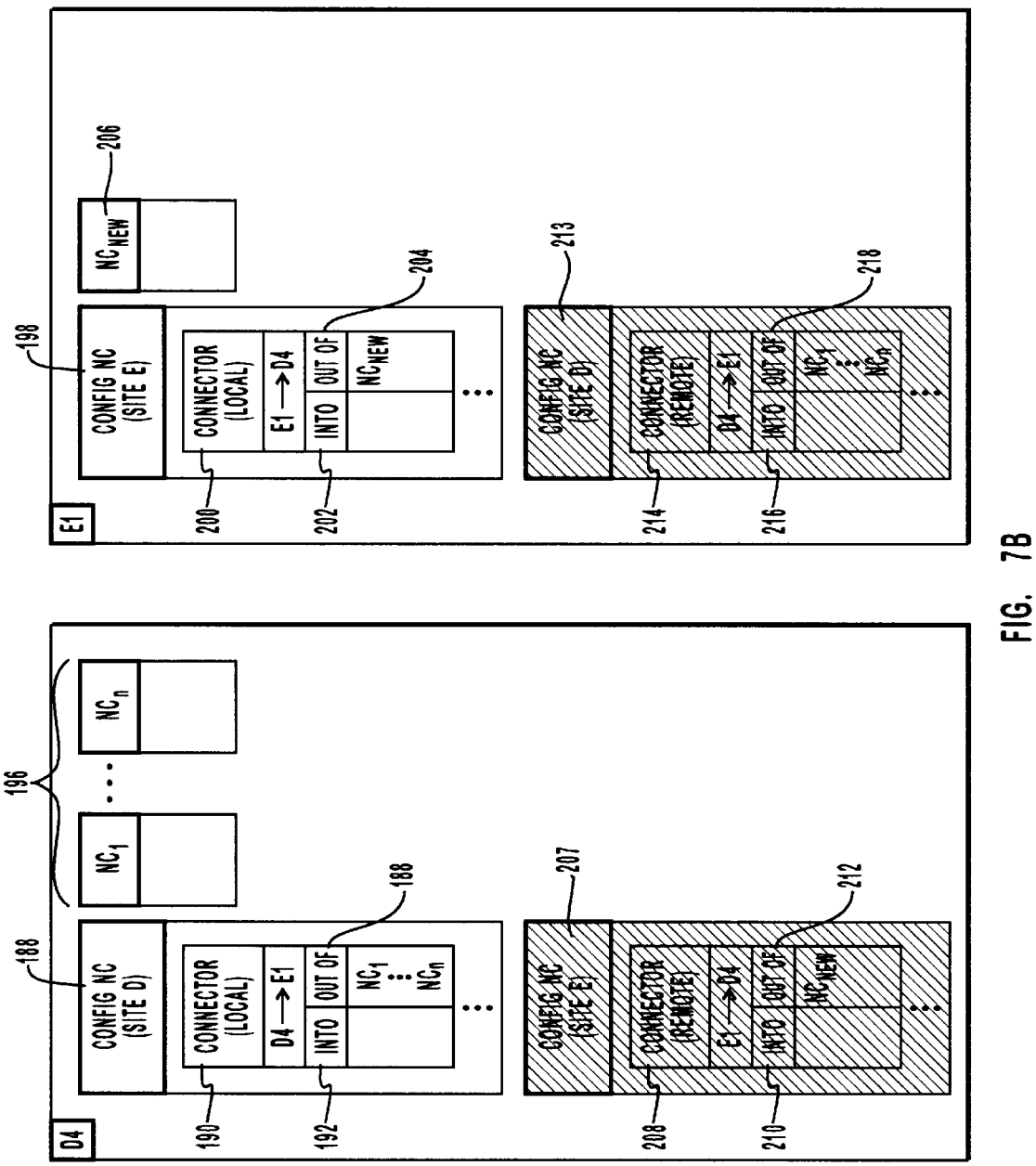

With the intersite connector objects created and in place within the respective configuration naming contexts and the appropriate replication configuration calls made, the replication mechanism will replicate the configuration naming context 188, having connector object 190, from existing server D4 to new server E1 as remote configuration naming context 213, having remote connector object 214. Conversely, the replication mechanism will replicate the configuration naming context 198, having connector object 200, from new server E1 to existing server D4 as remote configuration naming context 207, having remote connector 208, as shown in FIG. 7B. Since they are exact replicas, the remote connector object 208 will have an InTo list 210 and an OutOf list 212 having the exact entries as the InTo list 202 and the OutOf list 204 respectively of local connector object 200, and the remote connector 214 will have an InTo list 216 and an OutOf list 218 having the exact entries as InTo list 192 and OutOf list 194 respectively of local connector object 190.

Figure 7C:
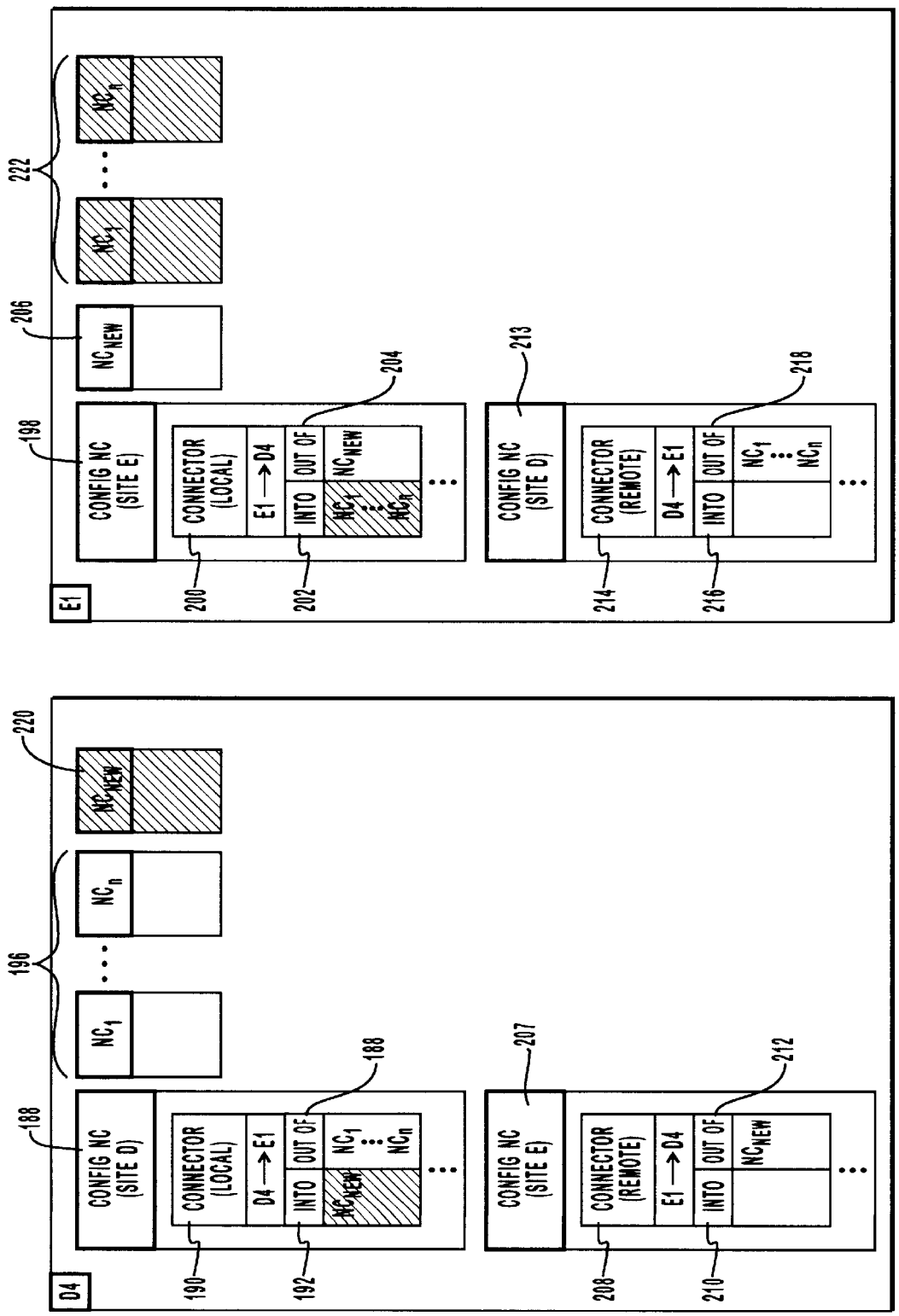

At this point, a knowledge consistency checker will run independently on existing server D4 and new server E1. Reference is now made to the flow chart shown in FIGS. 8A–8C representing the steps taken by the knowledge consistency checker for connector processing as enclosed by box 245. For the current example showing the integration of a new site into an existing system, only those steps relevant to this action will be discussed. A complete review of the knowledge consistency checker flowchart as shown in FIGS. 8A–8C will be undertaken subsequently The knowledge consistency checker running on the existing server E1 will determine at step 244 whether there are local connectors for processing. A local connector is one wherein the server running the knowledge consistency checker is connecting to another server. Local connector objects are received sequentially for processing at step 246. In the example of installing new site E, there would only be one local connector, namely local connector 200 (FIG. 7C).

Next, it is determined whether the conjugate or corresponding remote connector object to the local connector object received at step 246 is available for processing on the local server at step 248. In this example, the corresponding remote connector object replicated on the new server E1 would be remote connector object 214. Since it is available, the RepsTo list of the local connector object 200 is updated at step 250. The update step 250 requires that OutOf list 218 and into 202 be equivalent in order to create a complementary pair of connector objects. Any deletions of naming contexts or additions of naming contexts will then be reflected into the InTo list 202. In this particular example, the InTo list 202 is empty; therefore, the contents of OutOf list 218, which indicates the plurality of naming contexts 206, is copied into the InTo list 202 as shown by the relevant highlighted portion in FIG. 7C.

Now that the connector object 200 that is local to new server E1 has the correct naming contexts listed in the InTo list 202, the knowledge consistency checker will synchronize the replicas on new server E1 with that local connector information at step 264 (FIG. 8C). FIG. 7C shows the results of this synchronization process as the plurality of naming contexts 196 has been replicated from the existing server D4 onto the new server E1 representing site E as plurality of naming contexts 222 (highlighted).

The same process will occur on the existing server D4 as the knowledge consistency checker operates and processes the local connectors found therein. As above, the InTo list 192 of local connector object 190 is updated to reflect the new naming context 206 residing at the new server E1 at step 250 (FIG. 8B). Next, the new naming context 206 residing new server E1 is replicated as naming context 220 (highlighted) on the existing server D4 at step 268 (FIG. 8C).

Figure 7D:
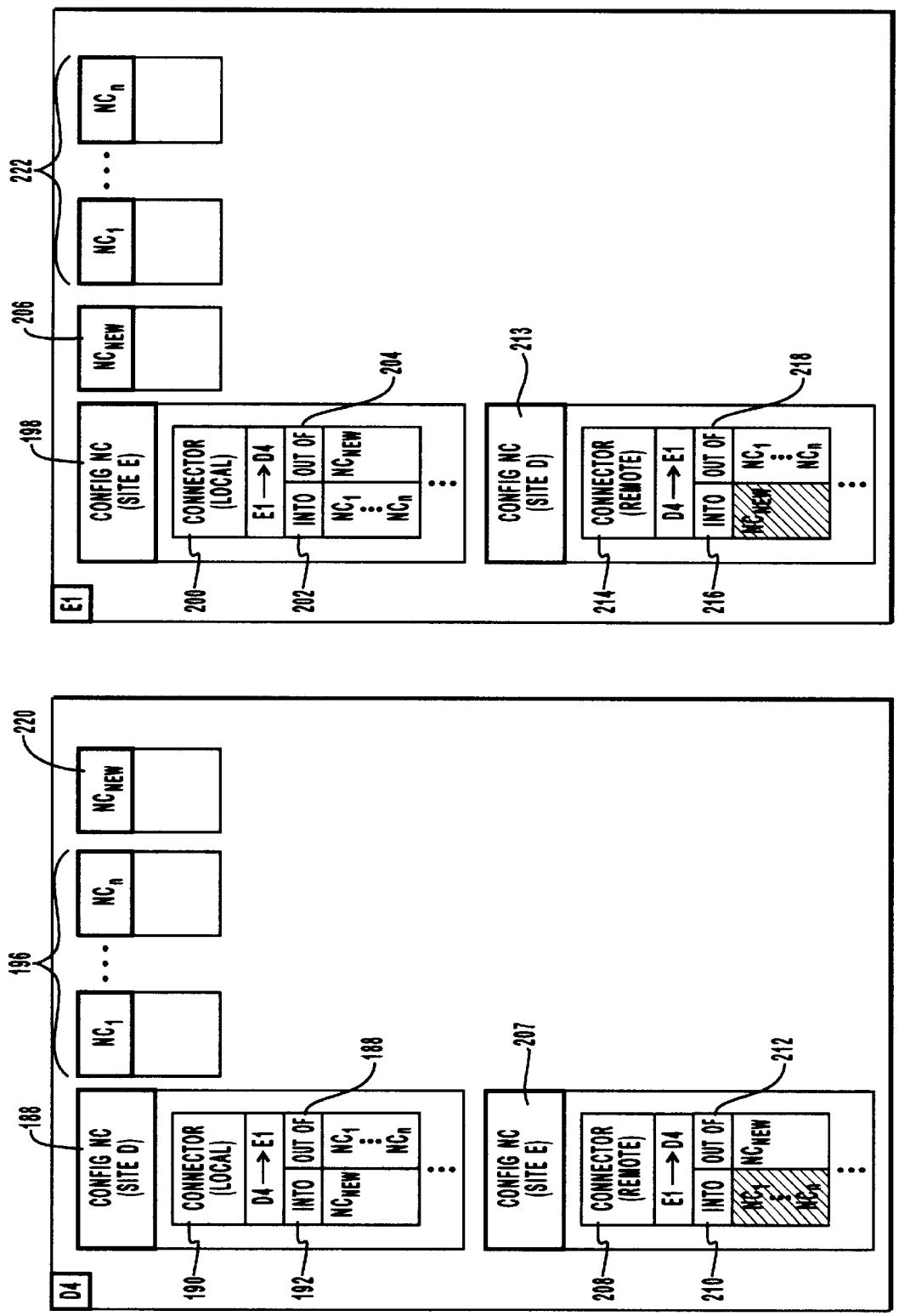

At this point, the system replication mechanism will operate correctly and all replicas of the naming contexts will be available at both sites and changes will be replicated accordingly. The final step shown in FIG. 7D shows that changes made to the local connector objects 190 and 200, respectively, in FIG. 7C are eventually replicated to the remote connector objects 214 and 208, respectively. Further, new servers may be added to the new site in the same manner as the new server was added to site C explained previously. As this is done, the system diagram of FIG. 4 results having the servers E1, E2, and E3 comprising the site E.

FIGS. 8A–8C and FIG. 9 represent the steps taken by the knowledge consistency checker and installation program respectively and the operation of these components will be explained in further detail. Referring now to FIG. 8A, the knowledge consistency checker is started and initialized as step 224. At step 226, contact is made to the local server through a defined interface allowing the knowledge consistency checker access to the directory residing thereon.

Step 228 and the steps enclosed in box 229 define the steps that process the configuration information of the local server (i.e., the server where the knowledge consistency checker program is running), by comparing it with the configuration information found on different servers within the site. One way of representing the configuration information as used in this exemplary embodiment is to record the servers comprising the site in a site server list object. The site server list object is read at step 228 and the servers listed therein are sequentially processed and accessed to compare and synchronize the site server lists on each of the servers within a site. When finished with this synchronization process, the site server lists should be the same on all servers within the site. Processing ends when either all servers in the list (including those added as a result of synchronization) are accessed or when a remote server's site server list is equivalent with the local server site server list. To accomplish this, a remote server's site server list is accessed at step 230. If the same knowledge of the site in terms of the server lists being equivalent is found at step 232, then processing continues on since the configuration information has no need of synchronization. If the lists are different, then, the site server lists are reconciled at step 234 by performing an OR function on both the local and requested site server lists and storing the aggregate site server lists on both of the respective servers. Should there be more remote servers to process as determined at step 236, the process is repeated otherwise processing continues to step 238 for reconciling the intersite replication information within the site.

Box 237 encompasses the process steps of reconciling the intrasite replication information. For this exemplary embodiment, the replication information is stored directly within the root object of each naming context. Other implementations may store such intrasite replication information in other ways using other structures and those skilled in the art will undoubtedly see a variety of possibilities. The purpose of reconciling the intrasite replication information is for allowing the replication mechanism to efficiently and correctly replicate all naming contexts across a given site.

It may be noted that this exemplary embodiment replicates on a naming context based while other embodiments that are within the scope of the invention may replicate on an actual object basis or other chosen unit of replication.

Further, the intrasite replication scheme chosen for this embodiment is full-mesh, meaning that every naming context is replicated on every server. Those skilled in the art will see that the same principals disclosed and claimed herein for maintaining the replication topology information would also apply to a Directory Service implementation or other distributed and replicated databases where replication is only partial (i.e., each naming context or other granular replication object is available on only some of the servers within a site).

A naming context is received for processing at step 238 from the list of naming contexts residing on the server. The root object intrasite replication information is reconciled at step 240 and an example of this was illustrated previously. Essentially, the knowledge consistency checker ensures that the naming context will either replicate to or replicate from every other server within the site in order to accomplish the full-mesh replication scheme. Because the perspective from each server is different, this replication information will be unique to each server and will need to be adjusted for deletions and additions of other servers within the site. Naturally, should something less than a full mesh replication scheme be implemented associated changes would need to be made. If more naming contexts exist as determined at step 242 the process repeats itself until all naming contexts have been processed and the intrasite replication information is reconciled with the synchronized configuration information of the site reflecting the additions and deletions of servers.

Next, the knowledge consistency checker will enter into the connector processing steps as represented by the steps enclosed by box 245. The purpose of intersite connections is to provide a mechanism for replication between different sites. Different sites may not be able to be fully mesh replicated since there is no guarantee that all servers will be available for direct communication between sites. Therefore, a different replication mechanism is used to replicate between sites that does not depend upon full server availability. In terms of processing, the replication mechanism between sites is "expensive" in terms of both the amount of information transmitted per unit of time and the time to replicate that information. Because of this, replication changes are typically made one time between the sites and then further replication is done through the intrasite replication mechanism once changes have been received at the destination site.

In order to get the information of a new naming context from a given site to each and every other site in the most efficient manner possible, the naming context replication changes should be communicated between each site only one time. Otherwise, system performance is sacrificed by excessive use of the "expensive" intersite communication paths. The connector processing ensures that a spanning tree of sites is set up to accomplish this single communication path of replication changes between sites.

Referring now to FIG. 8B, a list of local connectors if available is determined at step 244. A local connector is one wherein the local server or the server running the knowledge consistency checker is indicated as connecting to another remote server. A local connector is examined or received for processing at step 246 and it is determined whether or not there is the complementary remote connector replicated on the local server at step 248. Since the corresponding or complementary remote connector will have as its OutOf list the exact connectors that should be in the local connectors InTo list, the InTo list of the local connector is updated and made to be consistent with or reconciled with the remote connector at step 250. This process continues with more local connectors being processed if they are available as determined at step 252.

Once the individual connectors have had their InTo lists modified, then the OutOf list for the local connectors are reconciled. This begins by creating a list of all the inbound NCs pertaining to every connector local to the site at step 254. Connectors local to the site will originate from a server on the site (though not necessarily the local server) and connect to a server in another site. Each connector local to the server wherein the knowledge consistency checker is running is then processed beginning at step 256 where a connector is received for processing. The local connector is reconciled with the list of inbound NCs at step 258 according to the following method: begin with the entire list of inbound NCs, add any extra NCs from the site (i.e., that are residing on the local server and not yet reflected in other connector objects), and subtract any NCs indicated on this particular local connector's InTo list in order to arrive at the reconciled OutOf list. This ensures that each connector will have every NC on either the InTo list or the OutOf list and will also automatically set up the spanning tree so that replication changes made to an NC will be sent to a new site only one time. The list of local connectors is processed until exhausted as determined at step 260.

The form of communication making up the intersite connection as used by the replication mechanism may utilize asynchronous mail messages in order to communicate replication changes. In many circumstances, this may be the only sure way to communicate between the bridgehead servers since a site need not be fully connected to another site. Connections between the sites may be intermittently connected or partially connected meaning that some servers will not be available for direct access at least some of the time.

For each local connector, the server will synchronize replicas with the now reconciled local connector information at step 264. In other words, if a naming context doesn't exist at the local server where the knowledge consistency checker is running then that naming context will be brought onto that server according to the information in the local connector. Once set up by the knowledge consistency, checker all future events (i.e., additions, deletions, and modifications) will be handled by the system replication mechanism.

For each local connector, an authorization check is performed at step 266 to assure all replication authorizations are done so that a particular server may access a given object. Once the authorization check has been performed at step 266, all necessary replication can take place and will be permissible among the authorized servers.

When execution of step 264 requires bringing a new naming context replica onto a site server, that newly replicated naming context is replicated out to every other server in the site at step 268. When this is completed, every server on the site will now contain a replica of the naming context and any changes will be handled from this point on according to the operation of the replication mechanism.

This process ends at step 272 where it remains idle until the occurrence of a number of knowledge relevant events (step 224) such as, but not limited to, the addition of a new site, the addition or deletion of a naming context within the site, the installation of a new server or new site, etc. The knowledge consistency checker runs constantly in background mode monitoring for relevant as well as periodically cycling through the steps listed above in order to keep the knowledge or replication topology information, including intrasite replication information, configuration information, and connection information, up to date, synchronized and reconciled between the servers so that the replication mechanism may perform properly.

Because of the knowledge consistency checker relieves the system administrator from manually changing and connecting all of the knowledge for the replication mechanism (i.e., replication topology information), the installation program operated by the system administrator is relatively easy and straight forward. Referring now to FIG. 9, a flowchart is presented of the steps to accomplish the installation of a new server or a new site.

The program begins at step 274 and whether this is a new site installation or a new server installation within an existing site is determined at step 276. Should this be a new server being connected to an existing site, the administrator will identify one server existing on the site in some manner (e.g., an e-mail address, network IP address, etc. depending on the implementation) at step 278. Once that information has been given and the installation program modifies the configuration naming context of the new server so that the site server list object to include the existing server, the knowledge consistency checkers running independently on all servers within the site will automatically rectify and allow the replication mechanism to operate so that all naming contexts of the new server will now be found on all existing servers and conversely that the naming contexts found on the existing servers will be found on the new server with the replication mechanism propagating any changes thereto. At this point, the installation program will end at step 280.

Should there be a new site to be connected, the administration program will install the new server in stand alone mode at step 282. Technically, once installed in stand alone mode the new server is a site unto itself, but without any replication partners until other servers are added to the nascent site according to the methods described previously in connection with step 278.

Next, the installation program requires the system administrator to identify a bridgehead server on another site to which the new site will be connected. With this information the installation program creates on the new server a local connector between the new server and existing server at step 284. This local connector will contain within the OutOf list all of the naming contexts that are currently residing on the new server representing a new site. Some implementations may leave the OutOf list empty and rely on the knowledge consistency checker to determine its contents.

A corresponding new connector is created for the existing server that is stored locally and that indicates a connection between the existing server to the new server at step 286. Again all of the naming contexts found on the existing server will be placed in the OutOf list of the newly created existing server-to-new server connector. Again, it may be left the knowledge consisting checker to fill this OutOf list. When fully reconciled and replicated by the knowledge consistency checkers running on the existing server and the new server, respectively, this pair of newly created connector objects will be logically complementary with the NCs listed in the OutOf list on one connector object being the NCs listed on the InTo list of the other connector object and vice versa.

Once the connector objects have been created in the respective servers, the necessary configurations calls in order to authorize replication are made at step 288. At this point, the replication mechanism and the knowledge consistency checkers running on the respective servers will automatically make all the adjustments and reconciliation so that replicas will be made and replication will take place properly without any more intervention of the system administrator. Finally, the installation will end at step 280 until the system administrator restarts the program or otherwise returns to the beginning.

FIGS. 10 through 15 show the addition of a new site C onto an existing logical network of sites A and B and the associated changes in the connector objects within the different sites. These drawings depict the migration of connection information between the sites as well as the replication of the naming contexts themselves. At this global level, the individual servers are not shown, simply the naming contexts on a site and the connector objects that make up the intersite connection.

Figure 10A:
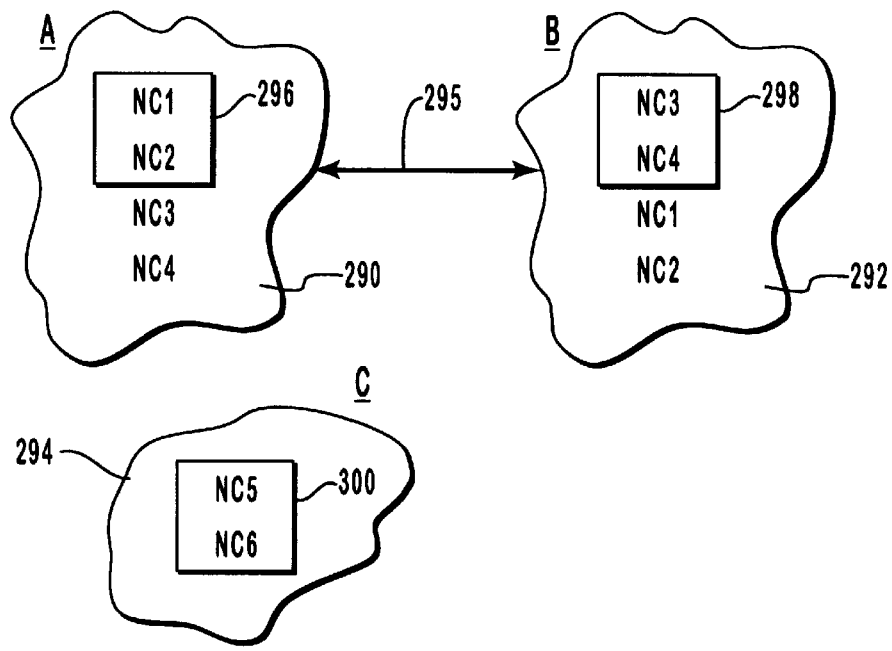
FIGS. 10A–10C are logical diagrams showing an intersite linkage made from site A to site C and the replication of naming context NC5 and NC6 from site C to site A.
Figure 10B:
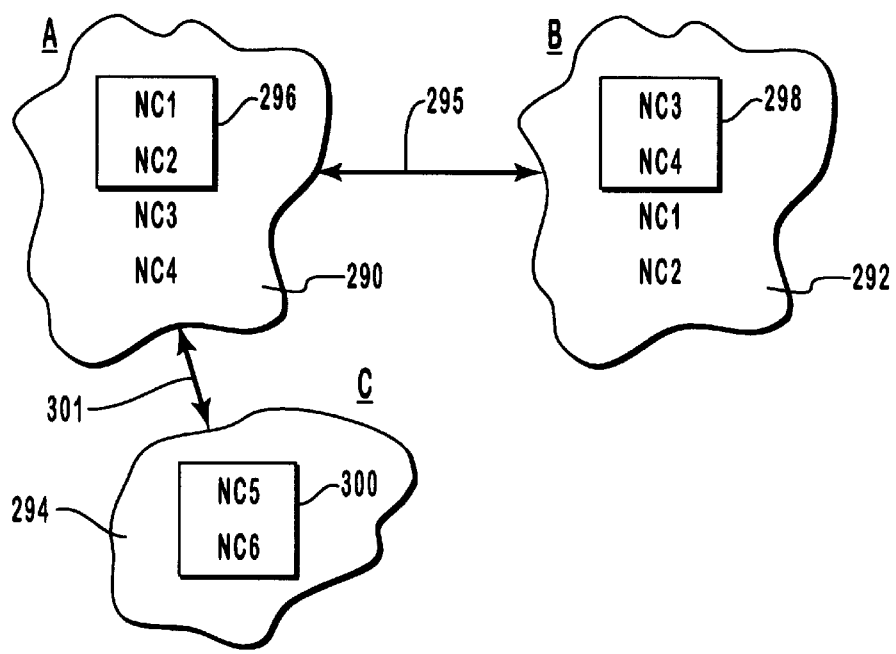
Figure 10C:
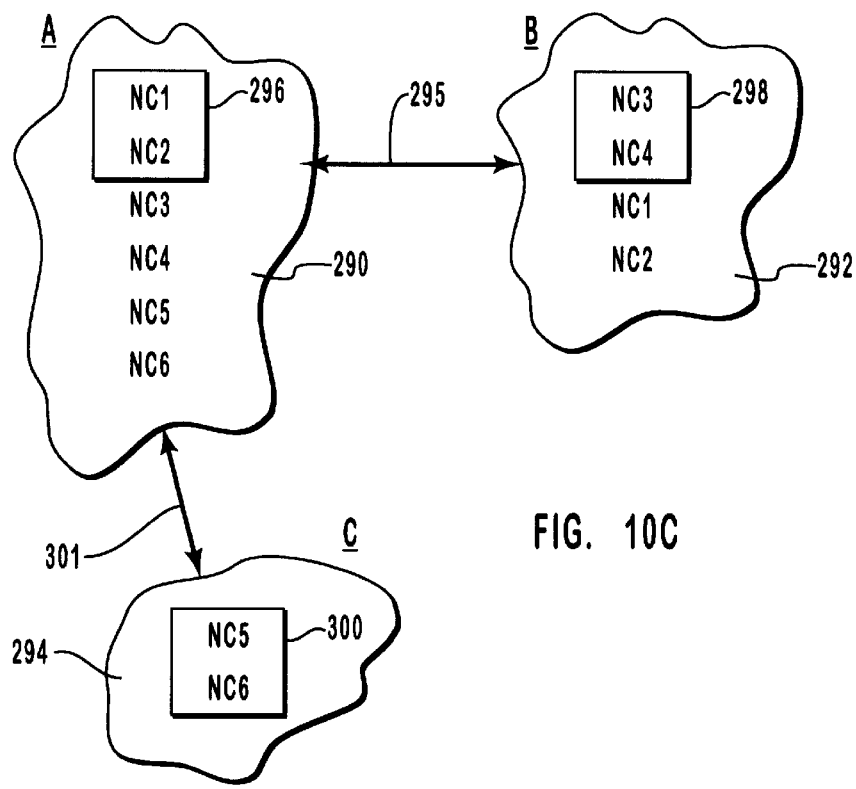
Figure 14A:
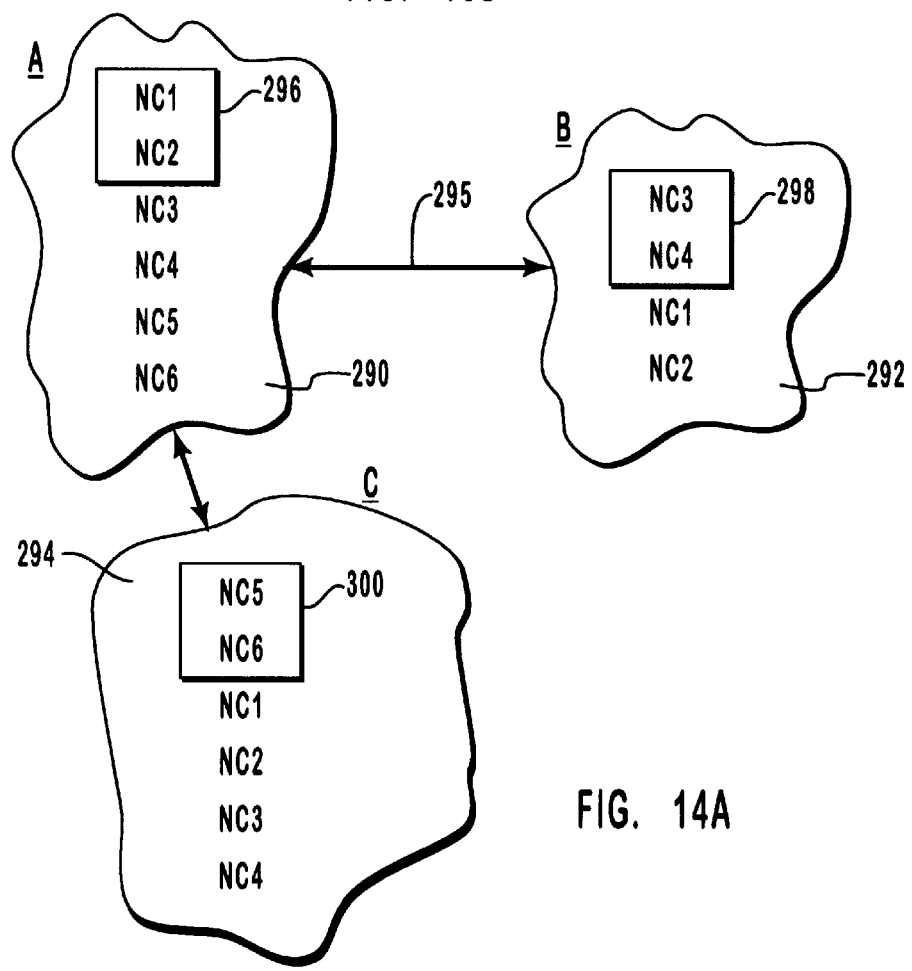
FIGS. 14A and 14B are logical diagrams showing the intersite migration of naming contexts NC5 and NC6 from site A to site B.
Figure 14B:
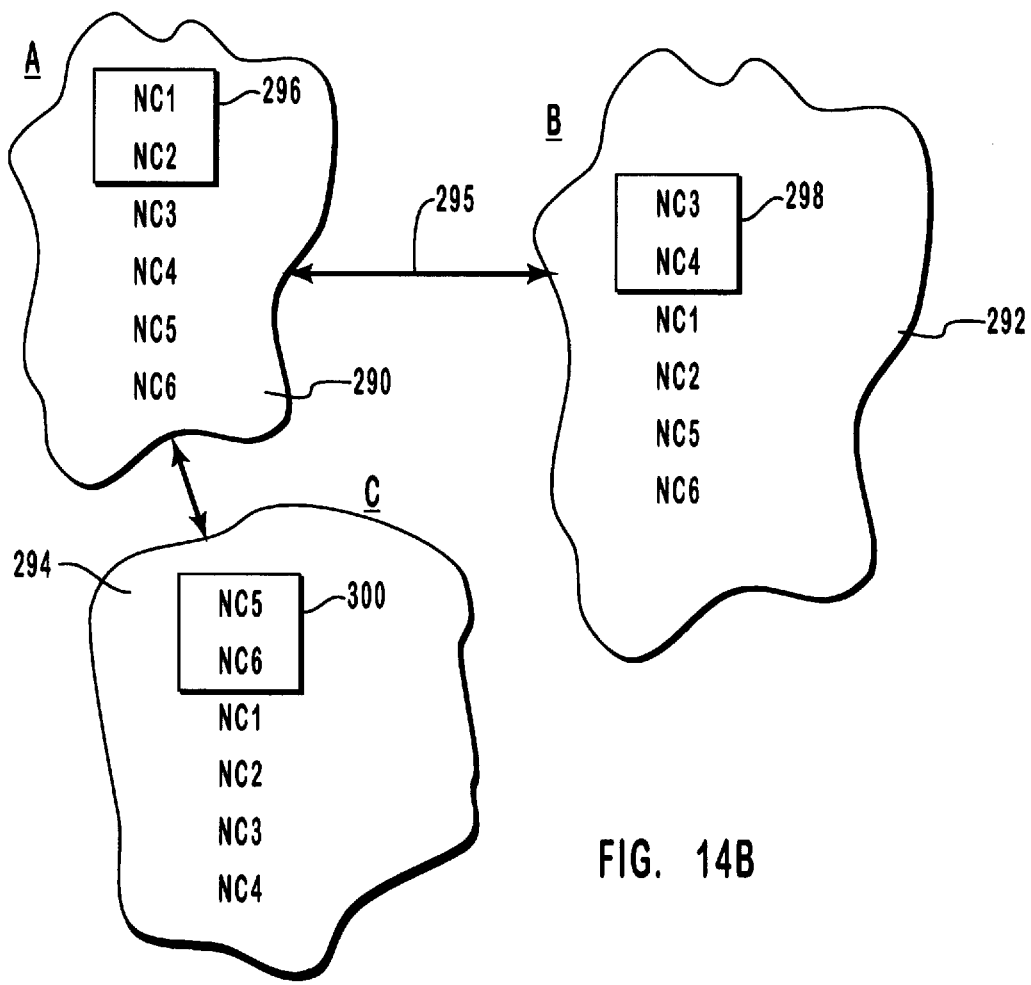
Figure 15A:
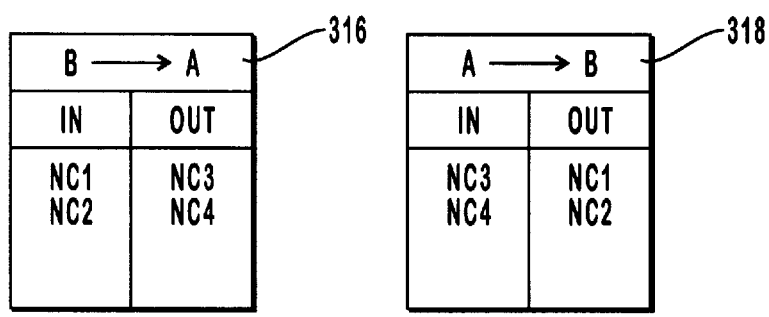
FIGS. 15A–15C are logical diagrams showing the changes and replication of the connector objects residing in site B as a result of the operation of the knowledge consistency checker that causes the migration of the new naming context NC5 and NC6 to migrate from site A to site B.
Figure 15B:
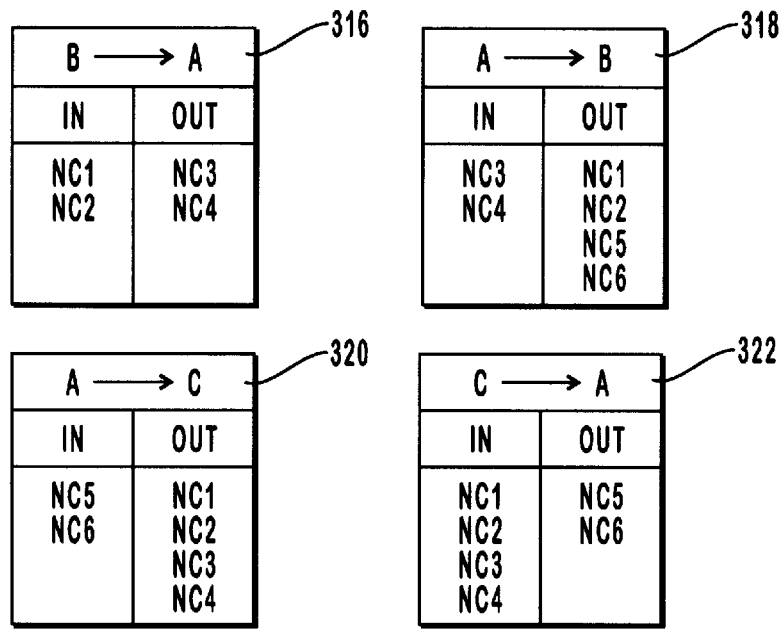
Figure 15C:
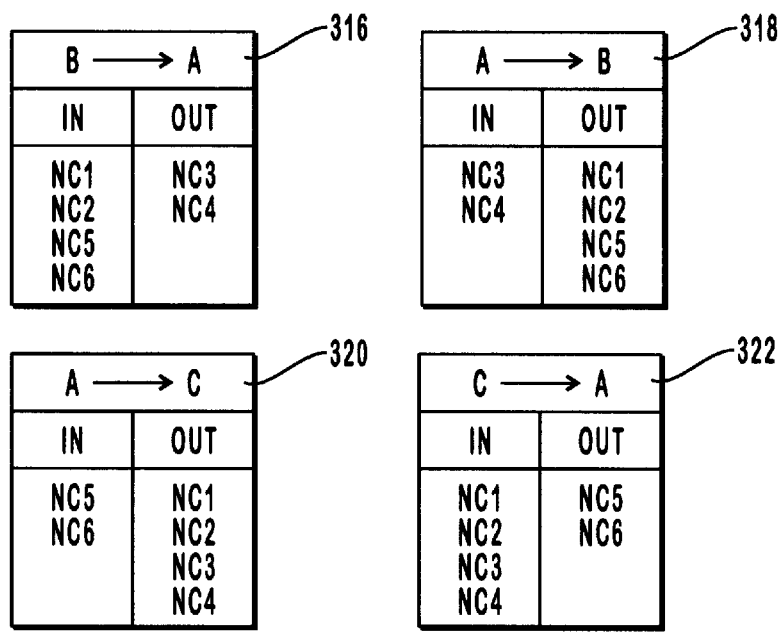

More specifically, FIGS. 10A–10C show the addition of site C and the migration of the new naming contexts from site C over to site A. Correspondingly, FIGS. 11A–11D show the changes made to the site A's replication objects in the configuration directory as the knowledge consistency checkers and the replication mechanism transfer information to site A. FIGS. 12A and 12B show the replication of the naming contexts from site A to the new site C, and FIGS. 13A–13D show the connector objects on site C as they are created by the installation program, replicated thereto by the replication mechanism, and adjusted and reconciled by the knowledge consistency checker. Finally, FIGS. 14A and 14B illustrate the replication of the new naming contexts originating from site C as they are replicated onto site B with FIGS. 15A–15C showing the corresponding changes to the connector objects found at site B as they are replicated thereto and manipulated by the knowledge consistency checker running on site B.

FIG. 10A shows site A represented by cloud 290, site B represented by cloud 292, and site C represented by could 294. Sites A and B are logically connected through an intersite connection represented by line 295. Within the respective clouds representing the sites A–C, are the various naming contexts that reside therein. Site A contains NC1–NO with NC1 and NC2 enclosed in box 296 to designate that NC1 and NC2 originated at site A while the unbowed NC3 and NO originated on another site (site B) and were replicated over to site A by the replication mechanism. Site B contains the same four naming contexts, namely NC1–NO, however NC3 and NO are encompassed by box 298 to signify that they originated on site B. Sites A and B have the same naming contexts since there is a replication agreement between the sites over the intersite connection represented by line 295. Site C has two naming contexts, NC5 and NC6 encompassed by box 300 showing that they originate at site C. When site C is added to the Directory Information Tree, then NC5 and NC6 will be replicated to sites A and B while NC1–NO will be replicated to site C.

Figure 11A:
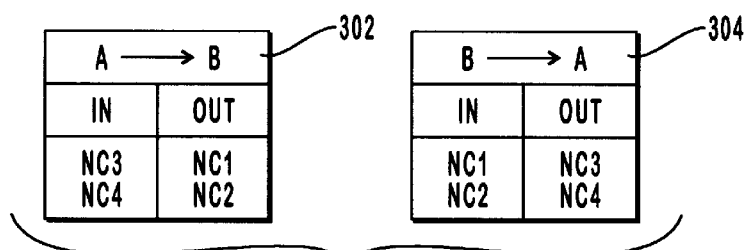
FIGS. 11A–11D are logical diagrams showing the state of connector objects in the configuration naming context of site A from the point prior to connecting site C to a point after all replication has quiesced.
Figure 12A:
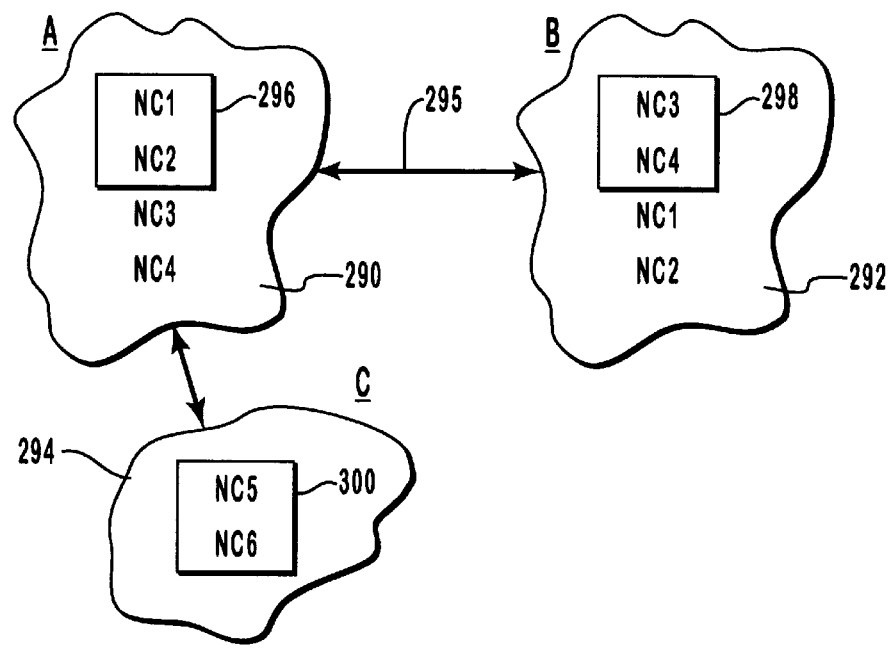
FIGS. 12A and 12B are logical diagrams showing the process of replicating the naming contexts residing in site A as they are replicated onto site C after site C has been newly added.
Figure 12B:
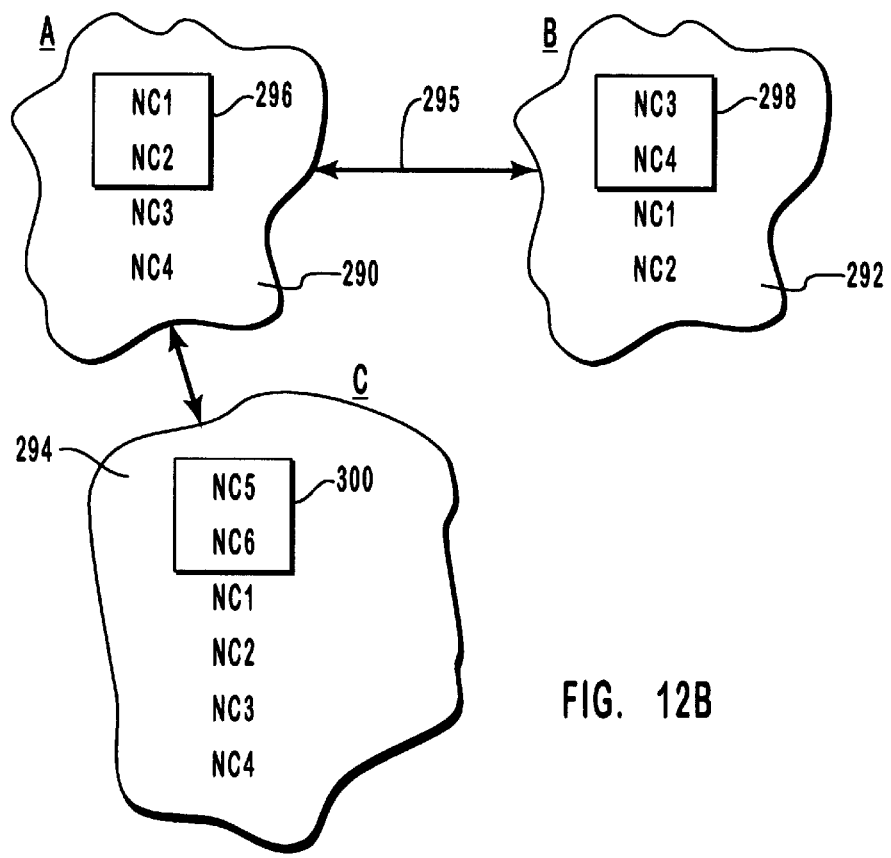

FIG. 11A shows the connector objects residing at site A before the new site C is installed. While the notation signifies a site-to-site connection, this is an abstraction for illustration purposes only and actual connector objects will be from bridgehead server to bridgehead server on the respective sites. FIG. 11A shows connector 302 going from site A to site B, and connector 304 going from site B to site A. The connector objects 302 and 304 have in their respective "InTo" and "OutOf" lists all of the NC's available between the two sites.

Referring now to FIG. 10B, site C has been added into the DIT by the installation program and the intersite connection is represented by line 301. This intersite connection from the perspective of site A is shown in FIG. 11B wherein connector 306 is added with all four of the existing naming contexts, NC1–NO, residing on site A being listed or indicated in the OutOf" list of connector object 306 for replication onto site C.

Figure 11B:
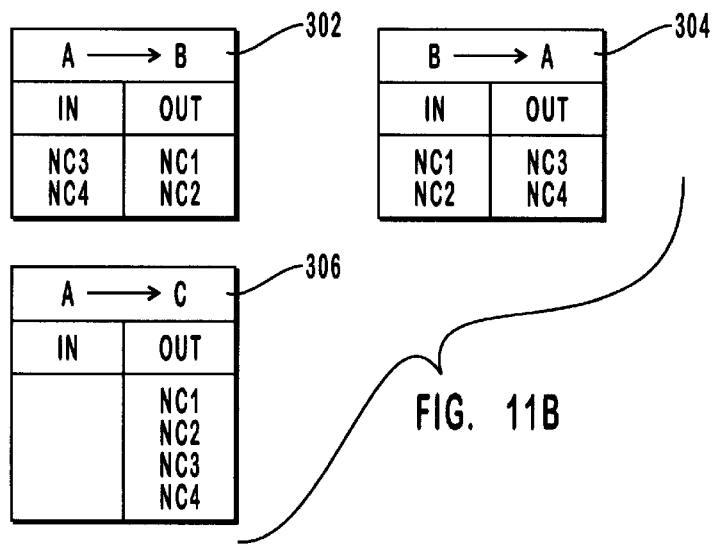
Figure 11C:
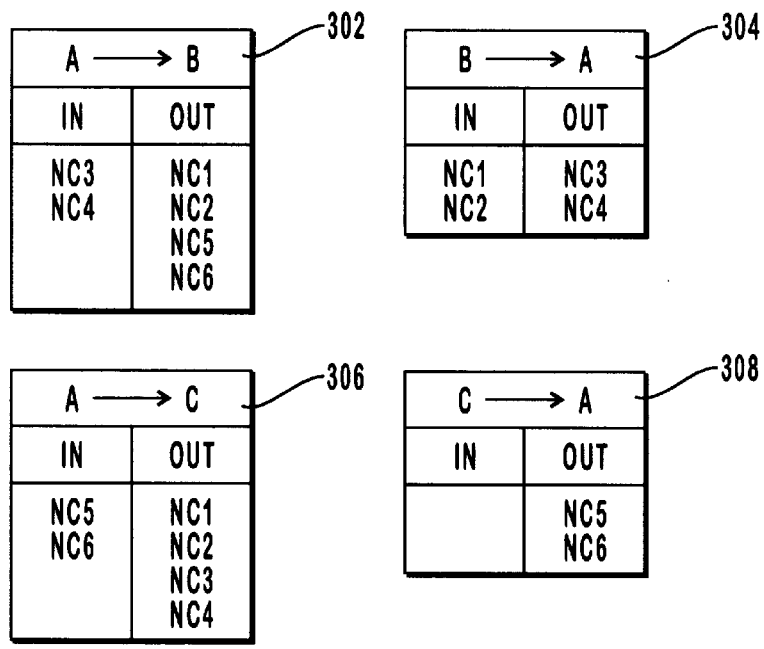

The state of the connectors as they are created and modified on site C and site B will be shown hereafter in FIGS. 13A–13D and 15A–15C, respectively, while FIGS. 11A–11C focus on the happenings on site A. FIG. 11C shows the replication of connector 308 from site C to site A; connector 308 being complementary of connector 306. The knowledge consistency checker running on the bridgehead server of site A will reconcile connectors 306 and 308 by adding to the InTo list of connector 306 the indication for naming contexts NC5 and NC6. Also, at this point, the new naming contexts, NC5 and NC6, will be replicated across the link from site C to site A and the system will be ready for normal replication. This is shown in FIGS. 10C where the new naming contexts, NC5 and NC6, now reside at site A. Initially they will reside at the bridgehead server but the knowledge consistency checkers running on the servers located throughout site A and the replication mechanism itself will assure that these new naming contexts, NC5 and NC6, are replicated throughout every server on site A.

Figure 11D:
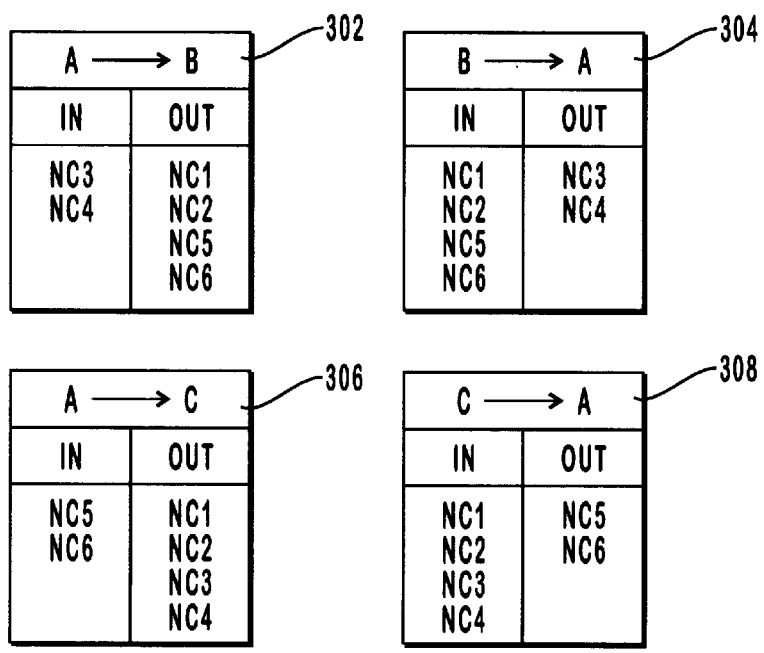

FIG. 11D shows the final phase of the process wherein replication changes on connector 308 are received indicating adjustments made to the InTo list of connector 308 on the replica of connector 308 residing originally on site C and adjusted or modified by the knowledge consistency checker on site C.

Figure 13A:
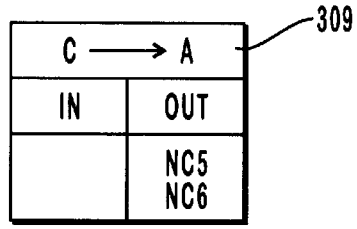
FIGS. 13A–13D are logical diagrams showing the manipulation of the connector objects as they reside in site C showing their replication and how they change as a result of replication and operation of the knowledge consistency checker while the naming contexts from site A are replicated over to site C.

FIGS. 13A–13D show the connector objects as found in the configuration naming contexts of site C. Initially, as shown in FIG. 13A, connector object 309 as created by the install program. Connector 309 has no naming contexts in it InTo list and will have indications for the new naming contexts NC5 and NC6 in the OutOf list. FIG. 12A shows the connection made from site A to site C as represented by line 301.

Figure 13B:
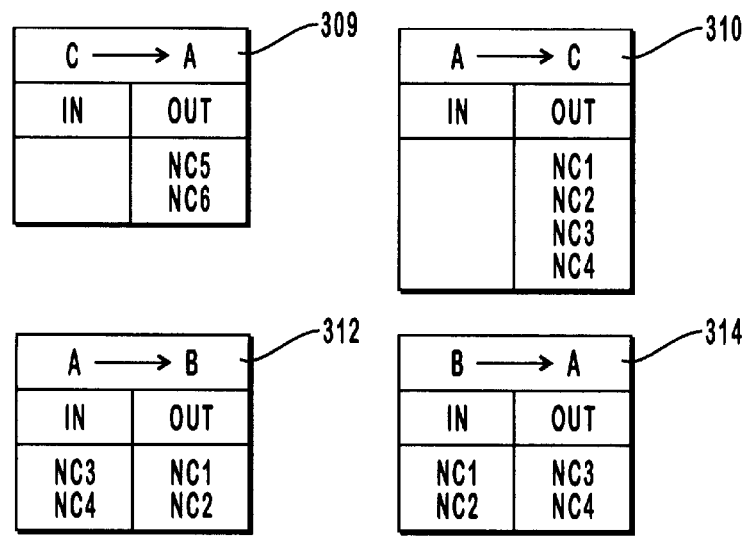
Figure 13C:
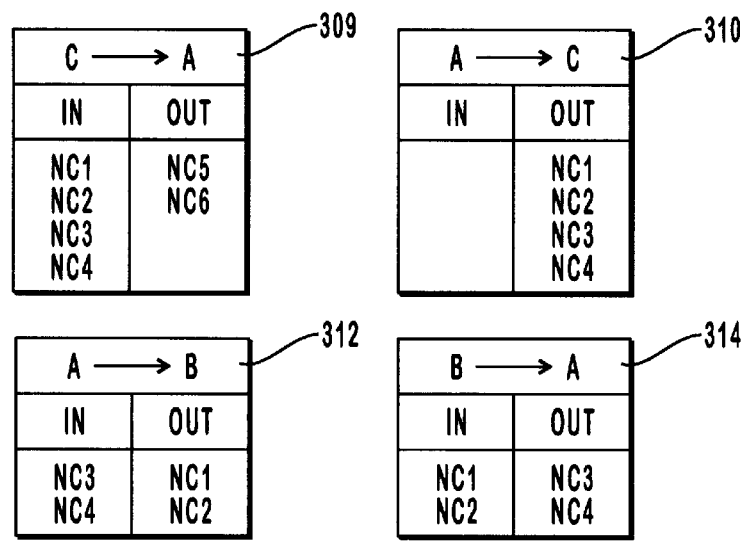

FIG. 13B shows the replication of the connector objects found on site A over to site C wherein connector 310, the conjugate or complementary partner to connector 309, is replicated over as well as the two existing connectors 312 and 314 that constitute the intersite link between site A and site B.

From the information from the newly replicated connector 310, the knowledge consistency checker running at site C will reconcile connector 309 so that the naming contexts NC1–NO are indicated in the "InTo" list. The knowledge consistency checker will replicate these naming contexts onto site C from site A as shown in FIG. 12B.

Figure 13D:
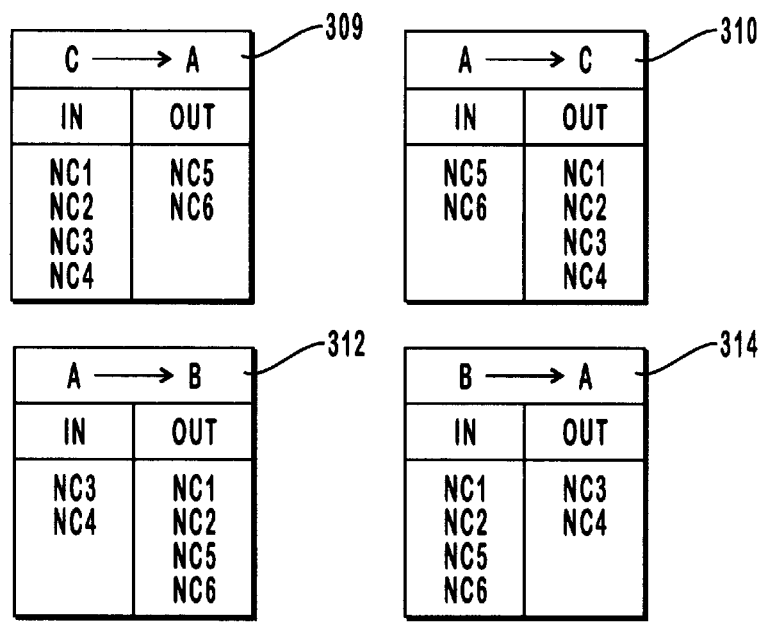

Finally, the replication mechanism will transport replication changes to arrive at the state of the connectors as shown in FIG. 13B. These replication changes reflect the modifications made to the various connector objects at the other sites by other knowledge consistency checkers running thereon. When the interaction of the knowledge consistency checkers and the replication mechanism quiesces, all the connectors at all the different sites should be equivalent. Because of this, FIGS. 11D and 13D are substantially equivalent differing only in the order that the connectors are presented for this discussion.

FIG. 14A shows the now current state of the DIT wherein sites A and C have been reconciled and site B is ready for reconciliation. The site C naming contexts NC5 and NC6 now reside on site A but need to be brought onto site B. The initial state of the site B connector objects is shown in FIG. 15A wherein connectors 316 and 318 represent the intersite link between site A and site B (line 295 in FIG. 14A). At this point connectors 316 and 318 only indicate the original naming contexts NC1–NO.

FIG. 15B represents the results of the replication mechanism replicating changes made to the connector going from site A to site B by the knowledge consistency checker running on site A and the addition or the replication of the connector objects representing the replication agreement between site A and site C. Therefore, connector 318 is modified and the pair of connectors 320 and 322, respectively, are now added into the configuration naming context found on site B.

Referring now to 15C, connector 316 representing the site B to site A connection is modified based on the connection information contained in the recently replicated connector objects to include in the InTo list the new naming contexts from site C, NC5 and NC6. Once this is completed, and replication quiesces, the resulting diagram of 15C is equivalent to those found in FIGS. 11D and 13D with the exception of ordering as used in this example.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer network having a plurality of server computers interconnected to one another, and wherein each server computer communicates with at least one other server computer, a method of propagating through the network replication topology information changes by permitting each server computer in the network to locally verify such changes by checking consistency of such changes with at least one other server computer, the method comprising the steps of:

comparing replication topology information contained at a first server computer with replication topology information contained at a second server computer; and reconciling the replication topology information at the first server computer by changing the replication topology information so that it is adjusted to be consistent with the replication topology information at both the first and second server computers, thereby replicating topology information changes at the first server computer; and thereafter reconciling the replication topology information at each of the remaining server computers by adjusting the replication topology information of each of said other server computers by rendering such information consistent with the replication topology information contained at any other server computers that communicate with said remaining server computers.

2. A method as recited in claim 1 wherein replication topology information comprises a list of server computers forming a site, and a RepsTo list and RepsFrom list indicating the server computers that changes to a replication entity will be sent to and sent from, respectively, in order to reduce network traffic.

3. A method as recited in claim 2 further comprising the step of adjusting the RepsTo list and the RepsFrom list so that each and every replication entity will appear on only one of the lists.

4. A method as recited in claim 1 wherein the first server computer is a bridgehead server at a first site of server computers and wherein second server computer is bridgehead server at a second site of server computers.

5. A method as recited in claim 4 wherein replication topology information comprises an InTo list indicating the replication entities whose changes will be received into a respective site and an OutOf list indicating the replication entities whose changes will be sent out of a respective site in order to reduce network traffic.

6. A method as recited in claim 5 further comprising the step of adjusting the InTo list and the OutOf list so that each and every replication entity will appear in only one of the lists, and so that the InTo list of the first site contains the same replication entities as the OutOf list of the second site and the OutOf list of the first site contains the same replication entities as the InTo list of the second site.

7. A computer program product propagating replication topology information in a computer network having a plurality of server computers interconnected to one another, and wherein each server computer communicates with at least one other server computer, the computer product comprising:

a computer usable medium having computer readable program code means embodied in said medium for propagating through the network replication topology information changes by permitting each server computer in the network to locally verify such changes by checking consistency of such changes with at least one other server computer;

program code means for comparing replication topology information contained at a first server computer with replication topology information contained at a second server computer; and program code means for reconciling the replication topology information at the first server computer by changing the replication topology information so that it is adjusted to be consistent with the replication topology information at both the first and second server computers, thereby replicating topology information changes at the first server computer; and program code means for thereafter reconciling the replication topology information at each of the remaining server computers by adjusting the replication topology information of each of said other server computers by rendering such information consistent with the replication topology information contained at any other server computers that communicate with said remaining server computers.

8. A computer program product as recited in claim 7 wherein replication topology information comprises a list of server computers forming a site, and a RepsTo list and RepsFrom list indicating the server computers that changes to a replication entity will be sent to and sent from, respectively, in order to reduce network traffic.

9. A computer program product as recited in claim 8 further comprising program code means for adjusting the RepsTo list and the RepsFrom list so that each and every replication entity will appear on only one of the lists.

10. A computer program product as recited in claim 7 wherein the first server computer is a bridgehead server at a first site of server computers and wherein second server computer is bridgehead server at a second site of server computers.

11. A computer program product as recited in claim 10 wherein replication topology information comprises an InTo list indicating the replication entities whose changes will be received into a respective site and an OutOf list indicating the replication entities whose changes will be sent out of a respective site in order to reduce network traffic.

12. A computer program product as recited in claim 11 further comprising program code means for adjusting the InTo list and the OutOf list so that each and every replication entity will appear in only one of the lists, and so that the InTo list of the first site contains the same replication entities as the OutOf list of the second site and the OutOf list of the first site contains the same replication entities as the InTo list of the second site.

* * * * *

UNITED STATES PATENT AND TRADEMARK OFFICE
CERTIFICATE OF CORRECTION

PATENT NO. : 5,832,225
DATED : Nov. 3, 1998
INVENTOR(S) : Donald Joseph Hackerl; John Freeman It is certified that error appears in the above-identified patent and that said Letters Patent is hereby corrected as shown below:

Col. 5, line 55, after "these" change "drawing" to --drawings--

Col. 6, line 42, after "on" change "server" to --servers--

Col. 10, line 2, after "information" insert a period

Col. 15, line 44, after "and" change "into" to --InTo list--

Col. 20, line 36, after "C represented by" change "could" to --cloud--

Col. 21, line 5, after "in the" change "OutOf"" to --"OutOf"--

Col. 24, line 13, after "that" change "changes" to --change--

Signed and Sealed this

Eighth Day of February, 2000

Attest:

Attesting Officer

Q. TODD DICKINSON

*Commissioner of Patents and Trademarks*